US011138699B2

(12) United States Patent
Wilensky et al.

(10) Patent No.: US 11,138,699 B2
(45) Date of Patent: Oct. 5, 2021

(54) UTILIZING CONTEXT-AWARE SENSORS AND MULTI-DIMENSIONAL GESTURE INPUTS TO EFFICIENTLY GENERATE ENHANCED DIGITAL IMAGES

(71) Applicant: Adobe Inc., San Jose, CA (US)

(72) Inventors: Gregg Wilensky, San Francisco, CA (US); Mark Nichoson, Palo Alto, CA (US); Edward Wright, Minneapolis, MN (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/440,471

(22) Filed: Jun. 13, 2019

(65) Prior Publication Data

US 2020/0394773 A1 Dec. 17, 2020

(51) Int. Cl.
*G06F 3/0484* (2013.01)
*G06T 5/00* (2006.01)
(Continued)

(52) U.S. Cl.
CPC .......... *G06T 5/009* (2013.01); *G06F 3/04845* (2013.01); *G06F 3/04847* (2013.01);
(Continued)

(58) Field of Classification Search
CPC ............. G06F 3/04847; G06F 3/04845; G06F 3/04883; G06F 2203/04808; G06F 3/0484;
(Continued)

(56) References Cited

U.S. PATENT DOCUMENTS

| 9,799,125 | B1 * | 10/2017 | Wegner | .................... G09G 5/02 |
| 2011/0019029 | A1 * | 1/2011 | Matsumoto | ........ H04N 5/23219 348/223.1 |

(Continued)

FOREIGN PATENT DOCUMENTS

GB 2510613 A 8/2014

OTHER PUBLICATIONS

Google, Snapseed, Nov. 30, 2016.
(Continued)

*Primary Examiner* — Phong X Nguyen
(74) *Attorney, Agent, or Firm* — Keller Jolley Preece

(57) ABSTRACT

The present disclosure relates to systems, methods, and non-transitory computer readable media that utilize context-aware sensors and multi-dimensional gesture inputs across a digital image to generate enhanced digital images. In particular, the disclosed systems can provide a dynamic sensor over a digital image within a digital enhancement user interface (e.g., a user interface without visual elements for modifying parameter values). In response to selection of a sensor location, the disclosed systems can determine one or more digital image features at the sensor location. Based on these features, the disclosed systems can select and map parameters to movement directions. Moreover, the disclosed systems can identify a user input gesture comprising movements in one or more directions across the digital image. Based on the movements and the one or more features at the sensor location, the disclosed systems can modify parameter values and generate an enhanced digital image.

20 Claims, 16 Drawing Sheets

(51) Int. Cl.
  *G06F 3/0488* (2013.01)
  *G06T 11/00* (2006.01)
  *G06T 11/60* (2006.01)
  *G06T 5/50* (2006.01)
  *H04M 1/72403* (2021.01)

(52) U.S. Cl.
  CPC ............ *G06F 3/04883* (2013.01); *G06T 5/50* (2013.01); *G06T 11/001* (2013.01); *G06T 11/60* (2013.01); *H04M 1/72403* (2021.01); *G06T 2200/24* (2013.01); *G06T 2207/10024* (2013.01); *G06T 2207/20172* (2013.01)

(58) Field of Classification Search
  CPC ........ G06F 3/0488; G06F 3/011; G06F 3/017; G06T 5/009; G06T 11/001; G06T 11/60; G06T 5/50; G06T 2207/10024; G06T 2200/24; G06T 2207/20172; G06T 2207/20104; G06T 2207/20101; G06T 5/008; G06T 5/005; G06T 7/13; G06T 7/90; G06T 5/00; H04M 1/72403
  See application file for complete search history.

(56) References Cited

U.S. PATENT DOCUMENTS

| | | | | |
|---|---|---|---|---|
| 2011/0074809 A1* | 3/2011 | Chen | ...................... | G06T 19/00 345/619 |
| 2011/0258537 A1* | 10/2011 | Rives | .................. | G06F 3/04883 715/255 |
| 2012/0033875 A1* | 2/2012 | Bergman | .................. | G06T 7/11 382/164 |
| 2012/0293427 A1* | 11/2012 | Mukai | ................... | G06F 3/0484 345/173 |
| 2013/0222313 A1* | 8/2013 | Nakamura | .......... | G06F 3/04845 345/173 |
| 2013/0235069 A1* | 9/2013 | Ubillos | .................. | G09G 5/026 345/594 |
| 2013/0239057 A1* | 9/2013 | Ubillos | ............... | G06F 3/04842 715/833 |
| 2013/0257896 A1* | 10/2013 | Nishiyama | ............ | G06T 11/001 345/593 |
| 2013/0329994 A1* | 12/2013 | Webb | ....................... | G09G 5/02 382/167 |
| 2014/0223388 A1 | 8/2014 | Kim et al. | | |
| 2015/0248221 A1 | 9/2015 | Sasaki et al. | | |
| 2015/0248774 A1* | 9/2015 | Sasaki | ...................... | H04N 9/68 382/167 |
| 2016/0011720 A1* | 1/2016 | Walther | .............. | G06F 3/04847 345/173 |
| 2016/0163066 A1* | 6/2016 | Ishihara | ............... | G06K 9/4661 382/162 |
| 2016/0335789 A1* | 11/2016 | Zhang | ..................... | G06T 7/194 |
| 2017/0185268 A1* | 6/2017 | Zeng | ..................... | G06F 3/04845 |
| 2018/0087984 A1* | 3/2018 | Hagelin | ..................... | G01L 5/16 |
| 2018/0352227 A1* | 12/2018 | Kobayashi | ............... | G06T 11/20 |
| 2018/0364901 A1* | 12/2018 | Fan | ..................... | G06F 3/04847 |
| 2019/0295223 A1* | 9/2019 | Shen | ..................... | G06N 3/0454 |

OTHER PUBLICATIONS

Combined Search and Examination Report as received in UK Application GB2003697.6 dated Aug. 25, 2020.
Examination Report as received in Australian application 2020201976 dated Aug. 24, 2021.

* cited by examiner

UTILIZING CONTEXT-AWARE SENSORS AND MULTI-DIMENSIONAL GESTURE INPUTS TO EFFICIENTLY GENERATE ENHANCED DIGITAL IMAGES

BACKGROUND

Recent years have seen significant improvement in software and hardware platforms for editing digital images. Indeed, conventional digital image editing systems can provide a variety of digital image editing tools that allow users to personalize, improve, and transform digital images. For example, conventional digital image editing systems can modify hue, saturation, and brightness of digital images, crop/replace objects portrayed in digital images, and/or correct imperfections in digital images captured by client devices.

Despite these advancements, a number of problems exist with regard to conventional digital image editing systems, particularly in efficiency, flexibility, and accuracy of operation. For example, with regard to efficiency, conventional digital image editing systems require significant time and user interactions to modify digital image parameters. For example, many conventional digital image editing systems utilize sliders or similar visual controls to change various parameters of a digital image. Such approaches are indirect, unintuitive, take up valuable screen real estate, and remove concentration from the digital image itself. For example, to modify exposure, contrast, shadows, highlights, and black and white cutoff points, some conventional systems utilize six separate slider elements. As a result, conventional digital image editing systems require excessive user interactions to locate (e.g., navigate various drop-down menus), select, and modify different sliders (or other individual controls) to generate a modified digital image.

In addition, conventional digital image editing systems are inflexible. For example, conventional digital image editing systems do not scale well to small screens, such as mobile devices. Indeed, because of the screen space devoted to chrome, drop down menus, sliders, or other visual user interface controls, conventional digital image systems often provide limited or reduced options on mobile devices (e.g., smart phones). In addition, because of the complexity of interacting with rigid user interface elements to change various digital image parameters, conventional digital image editing systems are often inaccessible to (and unused by) novice users.

Aside from efficiency and flexibility concerns, conventional digital image editing systems often generate inaccurate results. Indeed, because slider (or other user interface) elements are often difficult to find and intuitively utilize, client devices routinely generate digital images that do not accurately reflect desired/requested modifications. For example, to perform a change in brightness of a specific tonal region (while leaving other tonal regions unmodified) can require a series of specific changes to a variety of individual sliders. Because of the difficulty in precisely entering such modifications, conventional digital image editing systems often generate digital images that fail to accurately reflect desired modifications.

Thus, there are several technical problems with regard to conventional digital image editing systems.

SUMMARY

One or more embodiments provide benefits and/or solve one or more of the foregoing or other problems in the art with systems, methods, and non-transitory computer-readable storage media that utilize context-aware sensors and multi-dimensional gesture inputs to efficiently generate enhanced digital images. In particular, in one or more embodiments, the disclosed systems utilize a digital image enhancement user interface that does not include slider elements but controls multiple parameters of a digital image with intuitive two-dimensional gestures entered directly over a digital image. Moreover, the disclosed systems can utilize a dynamic sensor that tracks user movement relative to the digital image, detects aspects of underlying image regions, and reacts to the associated image content to generate enhanced digital images. By utilizing a dynamic sensor that determines digital image features at a sensor location and utilizing gesture inputs on a digital image to modify corresponding digital image parameters, the disclosed systems can efficiently, flexibly, and accurately generate enhanced digital images.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1:
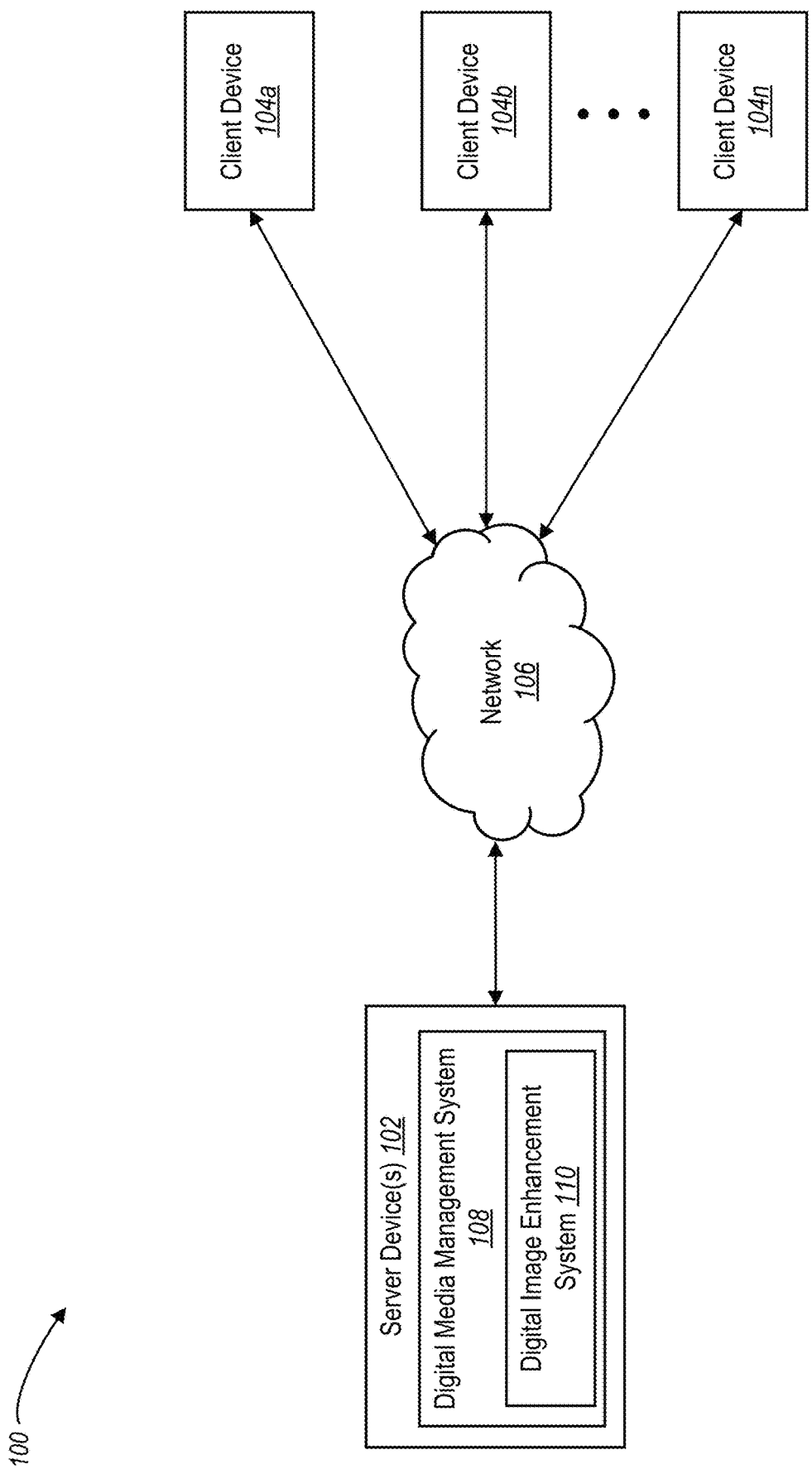
FIG. 1 illustrates an example environment in which a digital image enhancement system operates in accordance with one or more embodiments.

One or more embodiments of the present disclosure include a digital image enhancement system that utilizes context-aware sensors and multi-dimensional gesture inputs over a digital image to efficiently generate enhanced digital images. In particular, the digital image enhancement system can improve digital image editing by utilizing a digital image enhancement user interface without slider controls (or other visual selectable control elements). For example, in some embodiments, the digital image enhancement system utilizes multi-dimensional gestures across a digital screen portraying a digital image to modify parameters of the digital image. Moreover, the digital image enhancement system can utilize a dynamic sensor that determines features of selected locations of a digital image. The digital image enhancement system can dynamically determine modifications based on the underlying features together with the multi-dimensional gesture inputs across the digital image. By utilizing sensors and user input gestures on top of the digital image itself (without intrusive selectable controls) the digital enhancement system frees screen real estate to efficiently and flexibly generate accurate digital image modifications.

To illustrate, in one or more embodiments, the digital image enhancement system identifies a user selection of a first location (e.g., a sensor location) of a digital image within a digital image enhancement user interface. The digital image enhancement system can analyze the first location of the digital image and identify one or more features of the digital image at the first location (e.g., hue or objects portrayed at the first location). In some embodiments, the digital image enhancement system detects a user input gesture that includes a movement to a second location of the digital image enhancement user interface. Based on the movement to the second location and the one or more features of the digital image, the digital image enhancement system can determine a modification of one or more parameters of the digital image. Moreover, the digital image enhancement system can generate an enhanced digital image by applying the modification of the one or more parameters with regard to the digital image.

As just mentioned, the digital image enhancement system can utilize a user interface without sliders and other conventional visual selectable elements for modifying digital image parameters. In particular, in one or more embodiments, the digital image enhancement system can detect user input gestures that include movement in multiple directions to determine parameter values for modifying a digital image. To illustrate, the digital image enhancement system can determine a user input gesture that includes a first movement in a horizontal direction. Based on the first movement in the horizontal direction, the digital image enhancement system can determine a first parameter value (e.g., a change in saturation) for modifying the digital image. Similarly, the digital image enhancement system can detect that the user input gesture includes a second movement in a vertical direction. Based on this second movement, the digital image enhancement system can determine a second modified parameter value (e.g., a change in hue) for modifying the digital image. Thus, the digital image enhancement system can allow a user to modify one or more parameters of a digital image without having to navigate and utilize multiple different menus and sliders in a multi-step workflow. Rather, the digital image enhancement system can allow a user to interact directly and intuitively with an image to perform edits.

As discussed above, the digital image enhancement system can also utilize a context-aware sensor to determine features of a digital image and generate enhanced digital images. For example, in one or more embodiments, the digital image enhancement system provides a transparent sensor for display that follows dynamic user interaction within the digital image enhancement user interface. In response to a user selection of a sensor location, the digital image enhancement system can determine features of the digital image at the location. Specifically, the digital image enhancement system can isolate a region of the digital image encompassed by the transparent sensor and analyze the region (e.g., utilizing a color analysis model and/or an object identification model). Accordingly, the digital image enhancement system can determine a variety of features, such as color, hue, brightness, saturation, or objects portrayed in the digital image at the selected location.

Upon utilizing context-aware sensor to identify features at a selected location of the digital image, the digital image enhancement system can utilize the identified features as a basis to modify the digital image. For example, the digital image enhancement system can utilize the features at the sensor location to select parameters and map the parameters to particular aspects of user input gestures. To illustrate, the digital image enhancement system can detect a hue within a selected region of a digital image. Based on the detected hue, the digital image enhancement system can map a first parameter to movement in a horizontal direction (e.g., map saturation changes to horizontal movement) and map a second parameter to movement in a vertical direction (e.g., map hue changes to vertical movement). Thus, based on a selected location and intuitive gesture input over a digital image, the digital image enhancement system can intelligently detect features that a user seeks to modify and modify the digital image without the need to interact with any sliders or other visual controls.

In one or more embodiments, the digital image enhancement system also utilizes various modes to provide additional control for modifying parameters of a digital image. For example, the digital image enhancement system can utilize different input modes that correspond to different parameters and/or features that allow client devices to select what features or parameters to utilize in generating an enhanced digital image. To illustrate, the digital image enhancement system can include a color mode (e.g., that maps hue to a first movement direction and saturation to a second movement direction), a light mode (e.g., that maps brightness to a first movement direction and contrast to a second movement direction), a color curve mode (e.g., that maps movement directions to variables of a color curve), or a structural mode (e.g., that focuses on detecting and modifying underlying objects or structure portrayed in a digital image), or a style mode (e.g., that blends between predefined styles or filters based on user input gestures across a digital image). As discussed below, the digital image enhancement system can utilize a variety of different predefined or user-defined input modes for editing a digital image. Moreover, the digital image enhancement system can automatically determine an input mode based on a variety of factors (e.g., based on the digital image content or historical mode usage).

As mentioned above, the digital image enhancement system provides a number of advantages over conventional systems. For example, by utilizing a context-aware sensor and/or multi-dimensional gesture inputs to generate an enhanced digital image, the digital image enhancement system can improve efficiency relative to conventional digital image editing systems. Indeed, as mentioned above, the digital image enhancement system can avoid sliders or other visual elements utilized by conventional systems to modify digital image parameters. The digital image enhancement system can utilize a smart sensor to determine what parameters a user seeks to modify within a digital image. Moreover, the digital image enhancement system can utilize intuitive two-dimensional input gestures on top of the digital image itself to determine how a user seeks modify those parameters. Accordingly, the digital image enhancement system can significantly reduce the time and the number of user interactions to generate enhanced digital images. Indeed, based on a selection and movement over a digital image, the digital image enhancement system can perform complex modifications that would require dozens of user interactions with dropdown menus and sliders to accomplish using conventional systems.

In addition to efficiency improvements, the digital image enhancement system is also more flexible than conventional systems. By utilizing a digital image enhancement user interface (that does not include sliders, dropdown menus, chrome elements, or other toolbar elements that take up screen space or obscure the image), the digital image enhancement system can operate seamlessly across different client devices, including mobile devices (e.g., smartphones or tablets). In addition, by using a context-aware sensor, the digital image enhancement system can make flexible modifications specific to the features portrayed in a digital image (e.g., specific to objects or colors at a dynamic sensor location). Moreover, because the digital image enhancement system does not have to rely on various sliders for modifying different parameters, the digital image enhancement system is more accessible to client device users of various skill levels.

Moreover, the digital image enhancement system also improves accuracy relative to conventional systems. Indeed, by utilizing a sensor and intuitive multi-dimensional inputs, the digital image enhancement system can intuitively perform specific, complex modifications to a digital image that accurately reflect desired changes. To illustrate, to modify brightness of a specific tonal range within a digital image (while leaving other tonal ranges unchanged) utilizing conventional systems would require users to locate, modify, and balance a plurality of multiple sliders (or other user interface elements). Users often fail to identify and accurately adjust a variety of different visual elements to generate a desired result. In contrast, the digital image enhancement system can perform such a modification based on a selection of a location that portrays the tonal range in the digital image and a user input gesture over the digital image itself. Accordingly, the digital image enhancement system can generate more accurate digital image enhancements.

As illustrated by the foregoing discussion, the present disclosure utilizes a variety of terms to describe features and advantages of the digital image enhancement system. Additional detail is now provided regarding these terms. For example, as used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video. Accordingly, although much of the description herein is phrased in terms of digital images, it will be appreciated that the disclosure can also apply to editing digital video. Additionally, as mentioned above, the digital image enhancement system can generate enhanced digital images. As used herein, an "enhanced" digital image refers to a digital image with modified pixels. For example, an enhanced digital video includes a digital video where one or more parameters (e.g., hue, brightness, saturation, exposure) have been adjusted, changed, or modified.

As used herein, the term "parameter" (or "digital image parameter") refers to a visual feature, characteristic, or setting of one or more pixels of a digital image. In particular, a parameter of a digital image includes an adjustable characteristic or setting that impacts the appearance of a digital image. For example, a parameter can include hue (e.g., color on a color wheel), saturation (e.g., intensity or purity of a hue from gray tone to pure color), brightness (e.g., relative lightness or darkness of a color from black to white), contrast (e.g., a measure of difference between light and dark pixels in a digital image), or exposure (e.g., a scaling in brightness across a digital image). Similarly, a parameter can include shadow parameters (e.g., for adjusting shadows or dark tonal regions of an image), highlight parameters (e.g., for adjusting light tonal regions of an image), black point (e.g., black cut-off point), white point (e.g., white cut-off point), vibrance (e.g., a measure of intensity of muted colors as opposed to well-saturated colors), clarity, color temperature, or color tint (e.g., a measure of mixture of color with white). Parameters can also include adjustable variables in relation to a color curve (e.g., edit points to modify a curve and/or shadow, highlight, black/white cut off parameters that impact a color curve).

In one or more embodiments, parameters have corresponding parameter values. As used herein, a "parameter value" refers to a measure, metric, level, or quantity of a parameter. For example, a hue parameter can include a hue value (e.g., a number of a color on a 360 degree color wheel). Similarly, a saturation parameter can include a saturation value (e.g., a percentage or some other measure of saturation).

As used herein, the term "modification" refers to a change or alteration. In particular, a modification to a parameter includes a change or alteration to a parameter of a digital image. For example, a modification to a parameter includes a change of a parameter value (e.g., a saturation value, brightness value, or hue value). As outlined in greater detail below, the digital image enhancement system can determine a modification by selecting one or more parameters to change (e.g., based on features of a digital image) and identifying a new parameter value (e.g., based on different dimensions of a user input gesture).

As mentioned above, the digital image enhancement system can utilize a sensor in generating enhanced digital images. As used herein, a "sensor" (or "context-aware sensor" or "transparent sensor") refers to a user interface element that indicates a location or region of a digital image to be analyzed. In particular, a sensor can include a user interface element that defines a location or region of a digital image with underlying content analyzed to determine parameters of the digital image to modify. In some embodiments, the sensor is transparent (i.e., semi-transparent, in that it reveals or displays a portion of a digital image that overlaps with the sensor), such as a transparent circle, that allows a user to see the underlying digital image while identifying a location to analyze (i.e., a sensor location).

As mentioned, the digital image enhancement system can analyze a region corresponding to a sensor to identify one or more features. As used herein, "features" of a location of a digital image refers to one or more visual characteristics portrayed in a region of the digital image. For example, features can include a measure of color (e.g., hue), saturation, or brightness of pixels within a region or location of a digital image. To illustrate, features can include a statistical measure, such as a mean or standard deviation of pixel hue, saturation, and/or brightness within a region. Features can also include a range, such as a range of hues, a brightness range (e.g., a tonal range such as shadow tones, mid-tones, or highlight tones), or a saturation range. Features of a location of a digital image can also include objects portrayed in the location of the digital image. In some embodiments, features also include other characteristics, such as time (e.g., time of day, date, or season) or geographic location portrayed in a digital image.

As used herein, the term "user input gesture" refers to a user interaction with a computing device. In particular a user input gesture can include a user interaction identifying a location in relation to a graphical user interface portrayed on a display screen of a computing device. For example, a user input gesture across a digital image (or "over" a digital image or "on" a digital image) can include a swipe gesture on a portion of a touchscreen displaying a digital image (e.g., a swipe gesture that falls within region of a graphical user interface displaying a digital image). In addition to a swipe gesture (via a touchscreen), a user input gesture can include a variety of alternative user interactions such as click and/or drag events (e.g., via a mouse), press events, multi-finger swipe events, and/or pinch events. A user input gesture can also include a non-contact gesture or event (e.g., a motion above a touchscreen or a movement captured by a digital camera).

As mentioned above the digital image enhancement system can determine that a user input gesture comprises a movement in one or more directions (e.g., dimensions). As used herein, a "movement" refers to a change, difference, or distance between two locations. In particular, a movement of a user input gesture includes a change, difference, or distance between a starting location and an ending location. A single user input gesture can include multiple movements relative to different directions (or dimensions). For example a diagonal swipe gesture includes a first movement in a first (e.g., horizontal) direction and a second movement in a second (e.g., vertical) direction.

As used herein, the term "input modes" (or "modes") refers to a set of features and/or parameters corresponding to a user selection and/or user input gesture. For example, an input mode can indicate a feature to analyze within a region of a user selection (e.g., an object or a color). Similarly, an input mode can indicate one or more parameters corresponding to one or more directions of movement in a user input gesture. For example, an input mode can indicate that a hue parameter corresponds to a first (horizontal) direction and that a saturation parameter corresponds to a second (vertical) direction.

Additional detail will now be provided in relation to illustrative figures portraying example embodiments and implementations of the digital image enhancement system. For example, FIG. 1 illustrates a schematic diagram of an environment 100 for implementing a digital image enhancement system 110 in accordance with one or more embodiments. As shown, the environment 100 includes server device(s) 102 connected to a plurality of client devices 104a-104n via a network 106 (examples of which will be described in more detail below with respect to FIG. 15).

As shown, the environment 100 may include the server device(s) 102. The server device(s) 102 may generate, store, receive, and transmit a variety of types of data, including digital images and enhanced digital images. For example, the server device(s) 102 may receive data from a client device, such as the client device 104a, and send the data to another client device, such as the client device 104b, 104c, and/or 104n. The server device(s) 102 can also transmit electronic messages between one or more users of the environment 100. In one example embodiment, the server device(s) 102 is a data server. The server device(s) 102 can also comprise a communication server or a web-hosting server. Additional details regarding the server device(s) 102 will be discussed below with respect to FIG. 15.

As shown, in one or more embodiments, the server device(s) 102 can implement all or a portion of a digital media management system 108 and/or the digital image enhancement system 110. The digital media management system 108 can collect, store, manage, modify, analyze, and/or distribute digital media. For example, the digital media management system 108 can receive digital media from the client devices 104a-104n, store the digital media, edit the digital media, and provide the digital media to the client devices 104a-104n.

The digital media management system 108 and/or the digital image enhancement system 110 can comprise application(s) running on the server device(s) 102 or a portion can be downloaded from the server device(s) 102. For example, the digital image enhancement system 110 can include a web hosting application that allows the client devices 104a-104n to interact with content hosted at the server device(s) 102. To illustrate, in one or more embodiments of the environment 100, one or more client devices 104a-104n can access a webpage supported by the server device(s) 102. In particular, the client device 104a can run a web application (e.g., a web browser) to allow a user to access, view, and/or interact with a webpage or website hosted at the server device(s) 102.

To provide an illustrative example, in one or more embodiments, the client device 104a captures a digital image and transmits the digital image to the server device(s) 102. The digital media management system 108 (via the server device(s)) can store the digital image. Moreover, the digital image enhancement system 110 can provide a digital image enhancement user interface for display via the client device 104a. The digital image enhancement system 110 can identify user interactions (via the client device 104a) including a selection and user input gesture. In response, the digital image enhancement system 110 can determine a modification to digital image parameters, generate an enhanced digital image by applying the modification to the digital image parameters, and provide the enhanced digital image for display (via the client device 104a).

As just described, the digital image enhancement system 110 may be implemented in whole, or in part, by the individual elements 102-106 of the environment 100. It will be appreciated that although certain components or functions of the digital image enhancement system 110 are described in the previous example with regard to particular elements of the environment 100, various alternative implementations are possible. For instance, in one or more embodiments, the digital image enhancement system 110 is implemented in whole or in part on the client device 104a.

Similarly, in one or more embodiments, the digital image enhancement system 110 may be implemented on the server device(s) 102. Moreover, different components and functions of the digital image enhancement system 110 may be implemented separately among the client devices 104a-104n, the server device(s) 102, and the network 106.

Although FIG. 1 illustrates a particular arrangement of the client devices 104a-104n, the network 106, and the server device(s) 102, various additional arrangements are possible. For example, the client devices 104a-104n may directly communicate with the server device(s) 102, bypassing the network 106. Or alternatively, the client devices 104a-104n may directly communicate with each other. Similarly, although the environment 100 of FIG. 1 is depicted as having various components, the environment 100 may have additional or alternative components.

Figure 2:
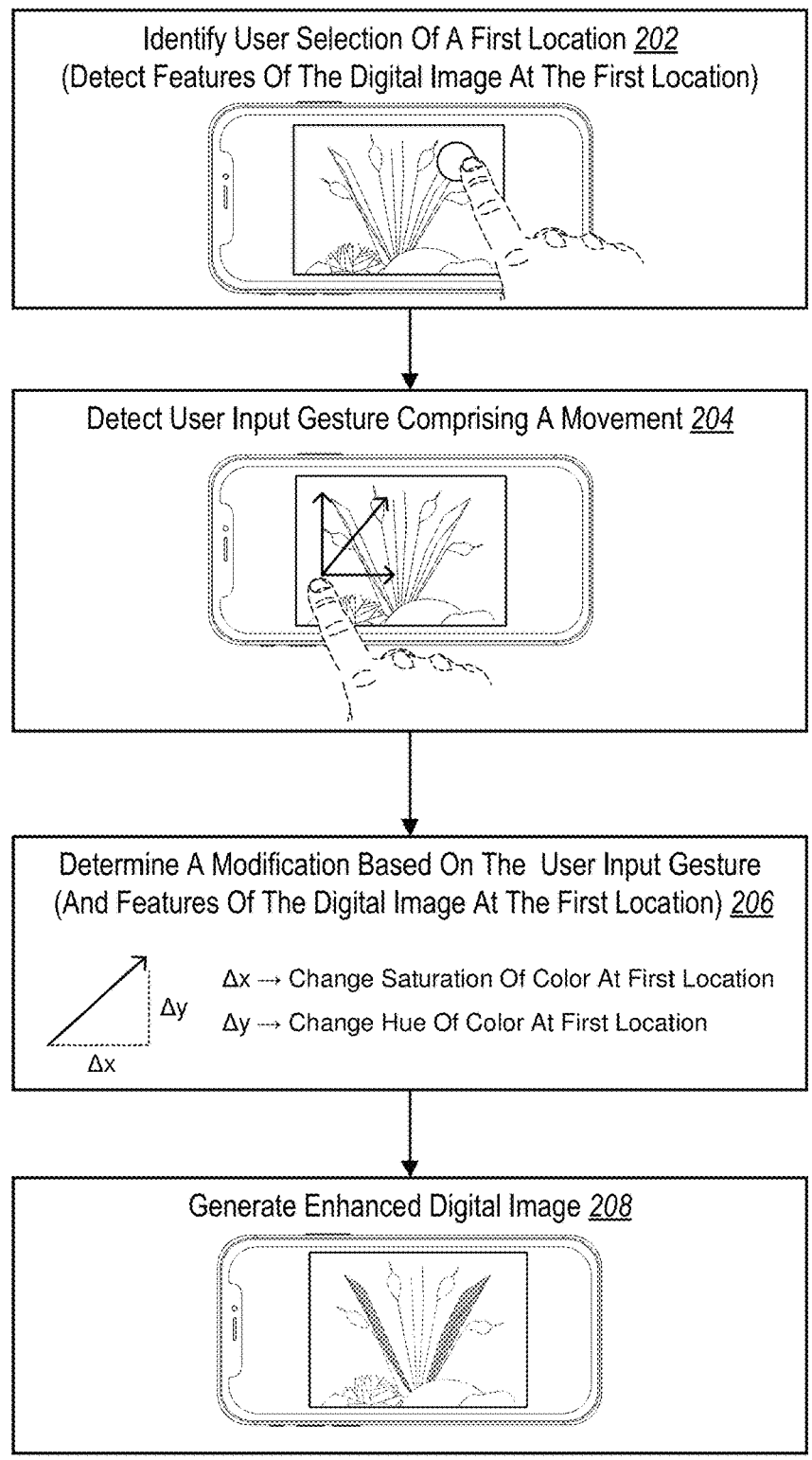
FIG. 2 illustrates a diagram of a process of generating enhanced digital images in accordance with one or more embodiments.

As mentioned above, the digital image enhancement system 110 can utilize a context-aware sensor and/or multi-dimensional user input gestures to generated enhanced digital images. FIG. 2 illustrates an overview of generating an enhanced digital image in accordance with one or more embodiments. In particular, FIG. 2 illustrates the digital image enhancement system 110 performing a sequence of acts 202-208.

Specifically, in relation to FIG. 2, the digital image enhancement system 110 performs the act 202 of identifying user selection of a first location. For example, as discussed above, the digital image enhancement system 110 can provide for display via a digital image enhancement user interface a digital image and a transparent sensor (i.e., a transparent sensor that appears on the digital image). The digital image enhancement system 110 can monitor user interaction with the digital image enhancement user interface (e.g., mouse movements or movements of a finger on a touchscreen) and modify the location of the transparent sensor. The digital image enhancement system 110 can analyze sensor locations of the digital image as the sensor moves.

For example, the user can drag a finger to the first location and apply a long-touch gesture to activate the sensor at the first location (e.g., based on the user moving the transparent sensor to a sensor location and applying a long-touch gesture). To illustrate, the digital image enhancement system 110 can perform the act 202 by detecting a movement of the transparent sensor to the first location (e.g., a user dragging a finger to the first location) followed by a long click, long press, or force touch event at the first location. Alternatively, the digital image enhancement system 110 can perform the act 202 by detecting touch down of a user input (e.g., finger, mouse, or stylus) at a first location on the digital image.

As illustrated in FIG. 2, the act 202 can also include detecting features of the digital image at the first location. For example, the digital image enhancement system 110 can apply a color analysis model and/or an object identification model to the sensor location. To illustrate, in some embodiments, the digital image enhancement system 110 identifies a region of the digital image based on the transparent sensor (e.g., a window encompassed by the transparent sensor) and analyzes the region of the digital image to identify features such as colors or objects portrayed in the region. Additional detail regarding identifying digital image features utilizing a sensor is provided below (e.g., in relation to FIG. 3). Based on the detected one or more features, the digital image enhancement system 110 can identify one or more parameters to be modified as described in greater detail below.

Upon performing the act 202, the digital image enhancement system 110 can also perform the act 204 of detecting a user input gesture comprising a movement. For instance, the digital image enhancement system can detect a user input gesture that includes a movement from an initial location to a subsequent location. For example, as mentioned above, the user input gesture can include a press event at an initial location and a drag event (across a path) to a subsequent location. As shown in FIG. 2, the user input gesture is provided across the digital image within the enhancement user interface. Thus, as discussed above, the digital image enhancement system 110 does not need to provide a visual element for receiving the user input gesture. Rather, in relation to FIG. 2, the digital image enhancement system 110 receives the user input gesture with respect to different locations that display the digital image within the digital image enhancement user interface.

As illustrated, the user input gesture can include movement(s) in one or more directions. For example, the digital image enhancement system 110 can detect a movement in a horizontal direction. The digital image enhancement system 110 can also detect a diagonal user input gesture and decompose the diagonal user input gesture into a first movement in a horizontal direction and a second movement in a vertical direction. Additional detail regarding analyzing user input gestures to identify movements and corresponding directions is provided below (e.g., in relation to FIG. 4).

As shown in FIG. 2, the digital image enhancement system 110 also performs the act 206 of determining a modification to be made based on the user input gesture. For instance, the digital image enhancement system 110 can determine modifications to parameters based on the movement(s) and corresponding direction(s) detected from the act 204. For example, the digital image enhancement system 110 can determine a modification to a first parameter of a digital image based on a first movement in a horizontal direction. In addition, the digital image enhancement system 110 can determine a modification of a second parameter of the digital image based on a second movement in a vertical direction. Accordingly, the digital image enhancement system 110 can determine modified parameter values for different parameters based on movements in different directions.

In some embodiments, the magnitude of a modification (e.g., the magnitude of change for parameter values) is based on the relative displacement of a movement in a particular direction. For example, the digital image enhancement system 110 can identify a horizontal distance between an initial location of a movement and a subsequent location of the movement and modify parameter values of a first parameter proportionate to the horizontal distance. In some embodiments, the magnitude of a modification is based on an absolute position within the digital enhancement user interface. For example, the digital image enhancement system 110 can map coordinates of the digital enhancement user interface to parameter values, detect a final position of a movement, and identify parameter values by based on the mapping and the coordinates of the final position. Additional detail regarding determining parameter values from a movement is provided below (e.g., in relation to FIG. 4).

As illustrated, the act 206 can also include determining a modification based on the features of the digital image at the sensor location. Indeed, in some embodiments, the digital image enhancement system 110 determines a parameter to modify based on features of the digital image at the sensor location. For example, the digital image enhancement system 110 can identify a hue, saturation, and/or brightness at the sensor location (from the act 202). In response, the digital image enhancement system 110 can select a modification to a corresponding hue, saturation, and/or brightness. To illustrate, upon detecting a blue color at the sensor location, the digital image enhancement system 110 can determine a first modification to a saturation parameter for blue colors within the digital image. Moreover, the digital image enhancement system 110 can determine a modification to a hue parameter for blue colors within the digital image.

Having identified parameters to modify (based on features at the sensor location), the digital image enhancement system 110 can determine a magnitude of parameter values based on the user input gesture. For example, continuing the previous example, the digital image enhancement system 110 can identify a modified saturation value for blue colors within the digital image based on movement in a horizontal direction. Moreover, the digital image enhancement system 110 can identify a modified hue value for blue colors within the digital image based on movement in a vertical direction. In this manner, the digital image enhancement system 110 can determine a modification of parameters based on both features at a sensor location and movement directions across a digital image in a digital image enhancement user interface. Additional detail regarding identifying parameters and parameters values based on a sensor and user input gestures is provided below (e.g., in relation to FIGS. 5-8).

In some embodiments, the digital image enhancement system 110 can also select features and/or parameters to analyze and/or modify based on input modes. For example, the digital image enhancement system 110 can utilize a plurality of input modes to select particular features to target and/or parameters to modify. For example, the digital image enhancement system 110 can utilize a first mode that detects brightness at a sensor location and modifies brightness (based on movement in a horizontal direction) and saturation (based on movement in a vertical direction). Similarly, the digital image enhancement system 110 can utilize a second mode that detects color at a sensor location and modifies saturation (based on movement in a horizontal direction) and hue (based on movement in a vertical direction). Additional detail regarding different modes is provided below (e.g., in relation to FIG. 8).

As shown in FIG. 2, based on determining a modification to be made (e.g., parameters to modify and corresponding parameter values) the digital image enhancement system 110 can perform an act 208 of generating an enhanced digital image. In particular, the digital image enhancement system 110 can generate and provide the enhanced digital image for display via the digital image enhancement user interface. The digital image enhancement system 110 can perform the act 208 by modifying the digital image in accordance with the parameters and parameter values determined at the act 206. For example, based on detecting a blue color at the sensor location, a horizontal movement, and a vertical movement, the digital image enhancement system 110 can modify the color of blue pixels (i.e., modify any pixels that fall within a threshold hue range of blue) in the digital image to purple and increase the saturation of blue pixels. Additional examples of generating enhanced digital images within a digital image enhancement user interface is provided below (e.g., in relation to FIGS. 9A-11).

The acts described herein (and in relation to FIG. 2) are intended to be illustrative, and are not intended to limit potential embodiments. Alternative embodiments can include additional, fewer, or different acts than those articulated or illustrated in FIG. 2. For example, in some embodiments prior to the act 202, the digital image enhancement system 110 applies a digital image correction algorithm. To illustrate, the digital image enhancement system 110 can apply a digital image correction algorithm to automatically modify certain parameters (e.g., brighten a dark image). The digital image enhancement system 110 can then continue to modify the digital image by performing the acts 202-208.

Moreover, the digital image enhancement system 110 can also select parameters based on applying a digital image correction algorithm. To illustrate, the digital image enhancement system 110 can apply a digital image correction algorithm that automatically adjusts parameters (e.g., to mimic a "professional" digital image appearance). The digital image enhancement system 110 can identify (or rank) resulting parameter changes from applying the digital image correction algorithm. For example, the digital image enhancement system 110 can rank parameters based on a percentage or value of change. The digital image enhancement system 110 can utilize the parameter changes from applying the digital image correction algorithm to select parameters corresponding to movements in various directions. For example, based on the ranked parameters from applying the digital image correction algorithm, the digital image enhancement system 110 can map a first parameter (e.g., a highest ranked parameter) to a horizontal direction and map a second parameter (e.g., a second ranked parameter) to a vertical direction.

The digital image enhancement system 110 can also select parameters based on a variety of other factors. For example, the digital image enhancement system 110 can select parameters based on content of a digital image or historical usage. To illustrate, the digital image enhancement system 110 can select a parameter based on frequency of use (e.g., the most-frequently used parameter across one or more users). The digital image enhancement system 110 can also select a parameter based on detecting an object (e.g., modify a brightness parameter upon detecting a flower).

Similarly, although many of the embodiments described in relation to FIG. 2 indicate modifying two parameters based on movements in two directions, the digital image enhancement system 110 can also modify additional parameters based on movement in different directions (or a single parameter based on movement in a single direction). For example, in some embodiments, the digital image enhancement system 110 can map four different directions to four different styles or filters. The digital image enhancement system 110 can modify parameters corresponding to the four different styles or filters based on movement corresponding to the four different directions. Additional detail regarding modifying style/filter parameters is provided below (e.g., in relation to FIG. 7).

Moreover, the acts described herein may be performed in a different order, may be repeated or performed in parallel with one another, or may be performed in parallel with different instances of the same or similar steps/acts. For example, in some embodiments the acts 204-208 can be iteratively repeated as a user performs different movements. For example, the digital image enhancement system 110 can dynamically generate a first enhanced digital image based on a movement to a location and generate an additional enhanced digital image based on an additional movement to an additional location. In this manner, the digital image enhancement system 110 can provide real-time dynamic feedback to a user regarding how modifications and movements impact the visual appearance of a digital image.

Similarly, the digital image enhancement system 110 can also repeat the acts 202-208 with regard to different sensor locations, different features, and/or different parameters. For example, the digital image enhancement system 110 can identify an additional sensor location selected by a user, determine additional features at the additional sensor location, identify additional user input gestures, and modify additional parameters (based on the additional features and the additional user input gestures) to generate additional enhanced digital images.

Figure 3:
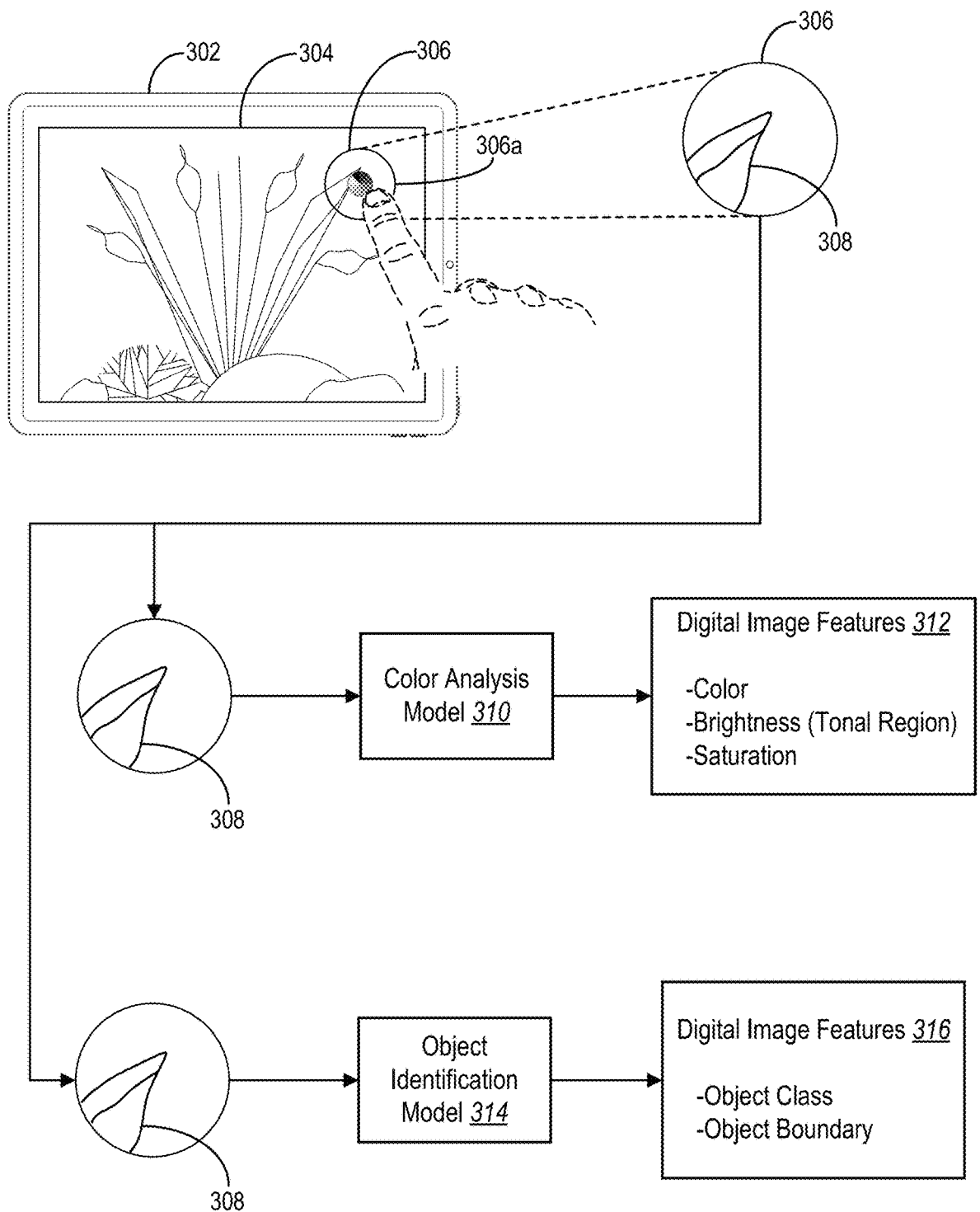
FIG. 3 illustrates a schematic of determining digital image features at a sensor location in accordance with one or more embodiments.

As discussed above, in some embodiments, the digital image enhancement system 110 utilizes a sensor to identify features at selected locations of a digital image. FIG. 3 illustrates utilizing a sensor to identify digital image features in accordance with one or more embodiments. Specifically, FIG. 3 illustrates a computing device 302 with a touchscreen portraying a digital image enhancement user interface 304. In particular, the digital image enhancement user interface 304 portrays a digital image (i.e., an image of foliage) together with a transparent sensor 306.

As illustrated in FIG. 3, the digital image enhancement system 110 provides the transparent sensor 306 for display based on user interaction with the digital image enhancement user interface 304. In particular, as a user moves a finger across the touchscreen, the digital image enhancement system 110 modifies the location of the transparent sensor 306. In response to selection of a particular location, the digital image enhancement system 110 can utilize the transparent sensor 306 to identify underlying content of the digital image.

For example, as shown in FIG. 3, the user selects a location 306a of the transparent sensor 306. In response, the digital image enhancement system 110 identifies digital image content 308. In particular, the digital image enhancement system 110 identifies a region of the digital image corresponding to the transparent sensor 306 (e.g., a region encompassed by the transparent sensor 306). The digital image enhancement system 110 identifies the digital image content by isolating the digital image based on the region corresponding to the transparent sensor 306. Thus, the digital image enhancement system 110 can utilize the transparent sensor 306 as a sampling window to identify digital content.

Upon identifying the digital image content 308, the digital image enhancement system 110 analyzes the digital image content 308 to determine digital image features. As shown in FIG. 3, the digital image enhancement system 110 can utilize a color analysis model 310 and/or an object identification model 314 to determine digital image features 312 and/or digital image features 316. In particular, the digital image enhancement system 110 can determine features such as color, brightness, saturation, object classes and/or object boundaries.

As illustrated, the digital image enhancement system 110 analyze the digital image content 308 utilizing the color analysis model 310. The color analysis model 310 can include a variety of computer-implemented algorithms. For example, the color analysis model 310 can include statistical models that determine color information with regard to individual pixels and generate various statistical measures. For example, the digital image enhancement system 110 can determine color, brightness, and/or saturation of each pixel at the location 306a and utilize the color analysis model 310 to determine mean, median, mode, variance, range, standard deviation, or skewness of the color, brightness, and/or saturation. The digital image enhancement system 110 can utilize these measures as the digital image features 312.

As mentioned above, the digital image enhancement system 110 can also determine features as ranges. For example, the digital image enhancement system 110 can determine a color range, a brightness range (e.g., a tonal range), and/or a saturation range. To illustrate, the digital image enhancement system 110 can utilize the color analysis model 310 to determine a tonal region (e.g., shadow, highlights, and mid-tones) corresponding to the first region. For example, the digital image enhancement system 110 can analyze pixels of the digital image content 308 and determine a measure of the frequency of particular tones (e.g., a histogram of pixel tone). The digital image enhancement system 110 can then determine whether the pixels in the digital image content 308 correspond to a particular tonal region. For instance, if a threshold number or percentile of pixels fall within a first range of tones (e.g., a lower third), the digital image enhancement system 110 can determine a shadow tonal region. Similarly, if a threshold number or percentile of pixels fall within a second range of tones (e.g., an upper third), the digital image enhancement system 110 can identify a highlight tonal region. Similarly, if a threshold number or percentile of pixels fall within a third range of tones (e.g., a middle third), the digital image enhancement system 110 can identify a mid-tone region.

In some embodiments, the color analysis model 310 comprises a machine learning model (such as a neural network). For example, the color analysis model 310 can include a convolutional neural network that classifies the digital image content 308 to generate the digital image features 312. To illustrate, the digital image enhancement system 110 can utilize a neural network classifier to determine a predominant color, brightness, or saturation for the digital image content 308.

As shown, the digital image enhancement system 110 can also utilize an object identification model 314 to generate digital image features 316. For example, the digital image enhancement system 110 can utilize the object identification model 314 to identify object boundaries and/or object classes based on the digital image content 308.

The object identification model 314 can include a variety of computer-implemented algorithms. For example, in some embodiments, the object identification model 314 includes a statistical object identifier. For example, in some embodiments, the object identification model 314 identifies objects based on statistical color profiles corresponding to particular objects. To illustrate, foliage tends to have a particular color profile (e.g., average color and standard deviation of colors). The digital image enhancement system 110 can detect the average color and standard deviation of colors within the digital image content 308, compare the average color and standard deviation to a foliage color profile, and determine that the digital image content 308 portrays foliage.

In some embodiments, the object identification model 314 includes one or more machine learning models (e.g., one or more neural networks). For example, the object identification model 314 can include a neural network classifier, such as a convolutional neural network. The digital image enhancement system 110 can utilize neural network(s) to determine object classes and/or object boundaries (e.g., object classification and segmentation). To illustrate, in some embodiments, the digital image enhancement system 110 utilizes YOLO (you-only-look-once) object detection algorithm.

Although FIG. 3 describes utilizing the color analysis model 310 and the object identification model 314 to determine particular digital image features, the digital image enhancement system 110 can utilize a variety of models to identify a variety of digital image features. For example, in some embodiments, the digital image enhancement system 110 can utilize a geographic location model and/or a time classification model to generate features that include time (e.g., season, time of day, time of year, or date) and geographic location.

The color analysis model 310 and/or the object identification model 314 can detect, utilize, and/or generate a variety of features. For example, the models can detect shape elements such as line segments and edges with various thicknesses and orientations. As mentioned, the color analysis model 310 can utilize convolutional neural network architectures (e.g., deep-learning networks) to capture relevant local image content in the vicinity of the sensor. For example, in some embodiments, the digital image enhancement system 110 utilizes pre-trained neural networks. A network trained to recognize objects or to reproduce images (e.g., auto-encoders) may be used. For this purpose, the trained network may be frozen and various hidden neuron activations used to represent the feature or features of interest. For example, a such a feature that responds to green, leaf-textured image content could drive changes in parameters associated with foliage such as changing green hues and changing medium spatial frequency content so as to control leaf sharpness without sharpening noise.

Moreover, although FIG. 3 illustrates the transparent sensor 306 in the form of a transparent circle, the digital image enhancement system 110 can utilize a sensor in a variety of different visual forms. For example, the digital image enhancement system 110 can utilize a sensor that is opaque. Moreover, the digital image enhancement system 110 can utilize a sensor that is a different shape, such as a square, oval, rectangle, triangle, or user-defined polygon.

Furthermore, even though FIG. 3 illustrates the digital image content 308 matching the region covered by the sensor 306, the digital image enhancement system 110 can analyze digital image content that does not align with the area of the sensor 306. For example, in some embodiments, the digital image content 308 is smaller than the area of the sensor 306 and in some embodiments the digital image content 308 is larger than the area of the sensor 306 (e.g., twice as larger as the sensor).

In some embodiments, the digital image enhancement system 110 can analyze a larger portion (or even the entire digital image) to determine a feature that falls within a location of the sensor. For example, to determine that a first location includes an object, the digital image enhancement system 110 can analyze the entire digital image, identify objects in the digital image, and determine whether the first location portrays a portion of one of the identified objects. To illustrate, in relation to FIG. 3, to determine that the location 306a of the sensor 306 includes a portrayal of foliage, the digital image enhancement system 110 can apply the object identification model 314 to a larger portion of the digital image (e.g., the entire digital image). The digital image enhancement system 110 can utilize the object identification model 314 to identify of the foliage in the digital image and then determine that the location 306a overlaps the identified foliage.

As mentioned above, the digital image enhancement system 110 can determine parameter values based on user input gestures comprising movements in one or more directions. In particular, in some embodiments, the digital image enhancement system 110 identifies a relative displacement (a relative change between an initial location and a subsequent location) and determines a proportionate change in a parameter value based on the relative displacement. In some embodiments, the digital image enhancement system 110 identifies a movement to a location and determines a parameter value based on the absolute position of the location within the user interface (i.e., not relative to the starting position). For example, FIG. 4 illustrates identifying parameter values from user input gestures based on relative displacement and absolute position of a movement location in accordance with one or more embodiments.

Figure 4:
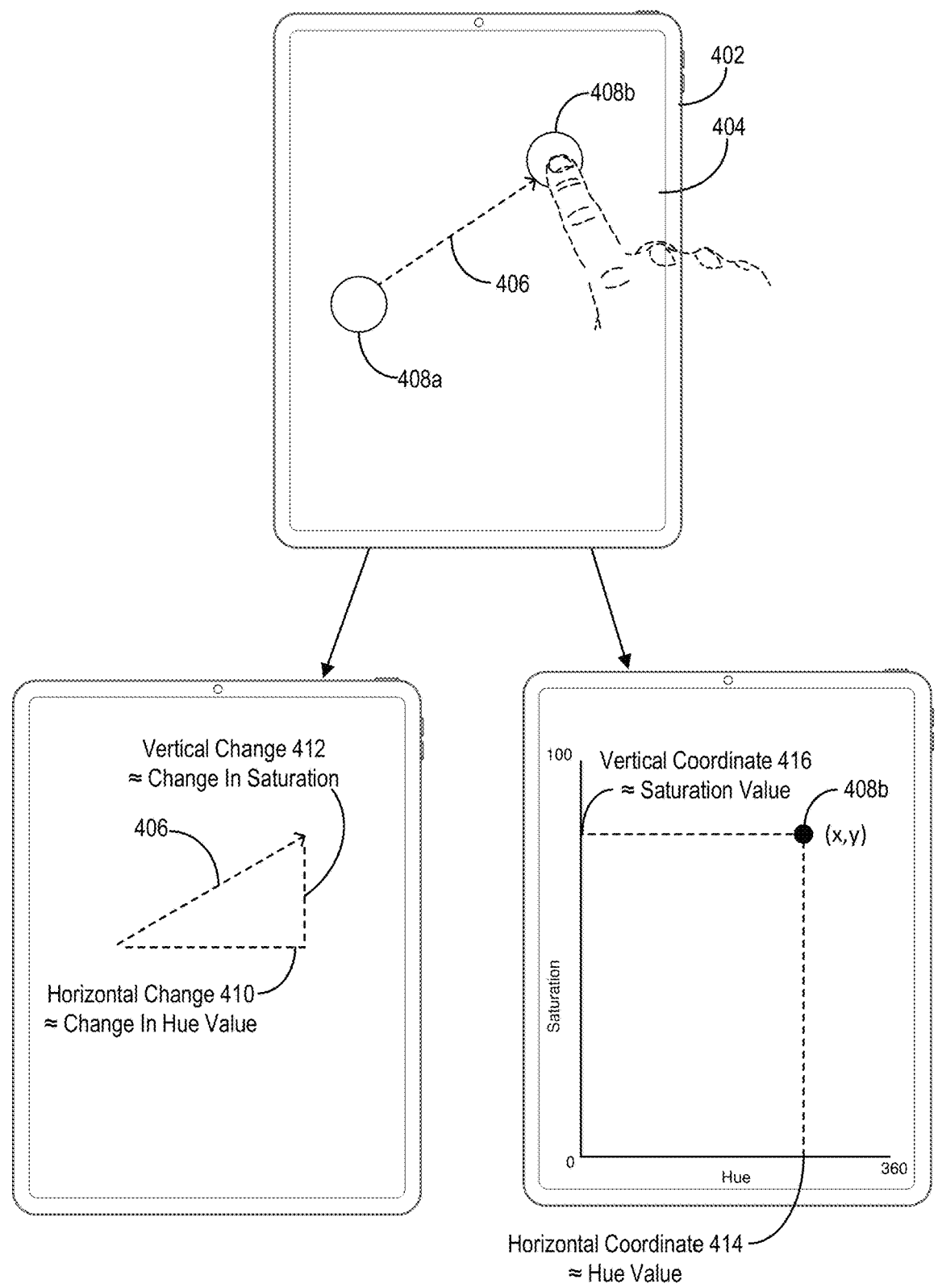
FIG. 4 illustrates determining parameter values from a user input gesture across a digital image in accordance with one or more embodiments.

Specifically, FIG. 4 illustrates a user input gesture (e.g., a press and drag gesture) on a computing device 402 having a display screen 404, where the user input gesture includes a movement 406 between an initial location 408a and a subsequent location 408b. As illustrated, in some embodiments, the digital image enhancement system 110 determines that the movement 406 includes a horizontal change 410 (i.e., a movement in a horizontal direction) and a vertical change 412 (i.e., a movement in a vertical direction). Based on the horizontal change 410, the digital image enhancement system 110 determines a corresponding (i.e., a proportionate) change in hue. Moreover, based on the vertical change 412, the digital image enhancement system 110 determines a corresponding (i.e., a proportionate) change in saturation. Thus, the change in parameter values is proportionate to the horizontal movement and vertical movement relative to the initial location 408a. Thus, the embodiment shown in FIG. 4 illustrates that the digital image enhancement system 110 can make modifications to two parameters in response to a single user input gesture (e.g., a diagonal touch gesture).

As illustrated in FIG. 4, in some embodiments the digital image enhancement system 110 determines that the subsequent location 408b comprises a horizontal coordinate 414 and a vertical coordinate 416 relative to a global coordinate system. In particular, the horizontal coordinate 414 reflects a horizontal distance from an origin of the global coordinate system and the vertical coordinate 416 reflects a vertical distance from the origin. The digital image enhancement system 110 maps coordinates (e.g., absolute positions) of the global coordinate system to a corresponding range of parameter values. Thus, the digital image enhancement system 110 maps position to corresponding parameter values (e.g., vertical positions have corresponding hue values ranging from 0-360 and horizontal positions have corresponding saturation values ranging from 0-100). As shown, the digital image enhancement system 110 utilizes the vertical coordinate 416 to determine a saturation value (e.g., 91) and utilizes the horizontal coordinate 418 to determine a hue value (e.g., 291).

Although FIG. 4 illustrates particular parameter types (e.g., hue and saturation), the digital image enhancement system 110 can determine parameter values for any parameters described herein. Moreover, although FIG. 4 utilizes the bottom left corner of the display screen as the origin of a cartesian coordinate system the digital image enhancement system 110 can utilize a variety of different coordinate systems (e.g., polar) and a variety of different origin points (e.g., origins based on different locations of the display screen, the user interface, a digital image, or an element within a user interface).

Additionally, although FIG. 4 illustrates a single user input gesture with a horizontal component and a vertical component, in alternative embodiments, the digital image enhancement system 110 can detect a first user input gesture that is in a first direction (e.g., horizontal direction) and a second user input gesture that is in a second direction (e.g., a vertical direction). In other words, the digital image enhancement system 110 can map a single user input gesture to a single direction. For example, the digital image enhancement system 110 can detect that a first user input gesture is within a threshold of a first direction (e.g., horizonal or vertical) and map the first user input gesture to the first direction even if the first user input gesture has a component in a direction other than the first direction. Thus, the digital image enhancement system 110 can make modifications to a single parameter in response to single user input gesture or make multiple modifications to multiple parameters in response to multiple separate user input gestures.

Figure 5:
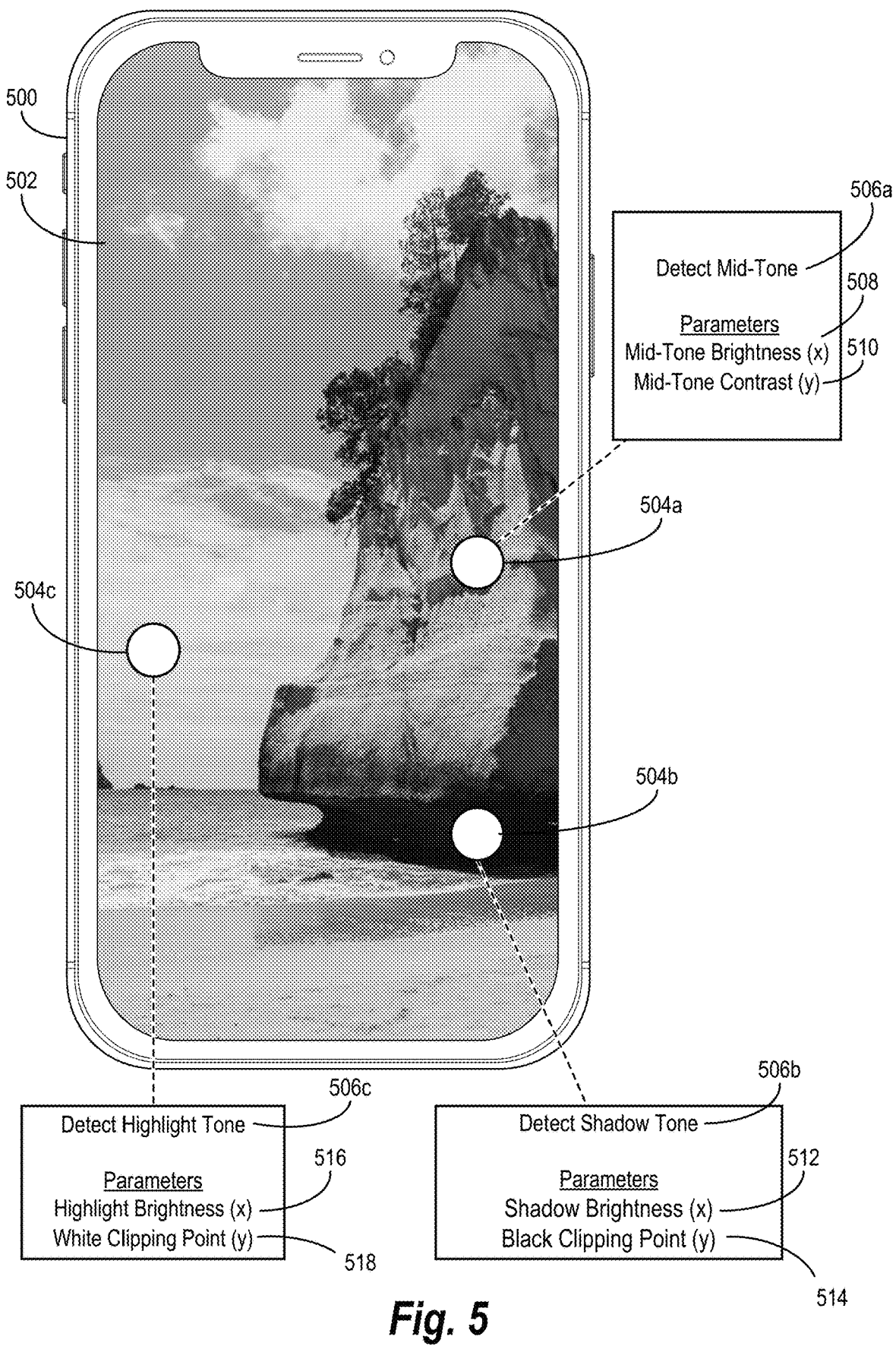
FIG. 5 illustrates selecting parameters to modify based on features detected at a sensor location of a digital image in accordance with one or more embodiments.

As mentioned above, in some embodiments, the digital image enhancement system 110 can select different parameters to modify based on features detected at a sensor location. FIG. 5 illustrates determining various parameters to modify based on different features (e.g., tonal regions) detected at different sensor locations of a digital image in accordance with one or more embodiments. For example, FIG. 5 illustrates a computing device 500 displaying a digital image 502. FIG. 5 also shows a first sensor location 504a, a second sensor location 504b, and a third sensor location 504c relative to the digital image 502. For each of the sensor locations 504a-504c, the digital image enhancement system 110 determines different parameters to modify based on detecting varying features of the digital image 502.

For example, with regard to the first sensor location 504a, the digital image enhancement system 110 detects that digital content at the first sensor location 504a corresponds to a first feature 506a (i.e., that the digital content at the first sensor location corresponds to a mid-tone). In response, the digital image enhancement system 110 can select a first parameter 508 (i.e., exposure) and a second parameter 510 (i.e., contrast). Moreover, the digital image enhancement system 110 can map the parameters to different directions (e.g., exposure corresponds to movement in a horizontal direction and contrast corresponds to movement in a vertical direction).

In addition, at the second sensor location 504b, the digital image enhancement system 110 detects a second feature 506b. In particular, the digital image enhancement system 110 detects that the digital content at the second sensor location 504b corresponds to a shadow tone. In response, the digital image enhancement system 110 can select a third parameter 512 (shadow brightness) and a fourth parameter 514 (black clipping point). Moreover, the digital image enhancement system 110 can map the parameters to movement directions (e.g., shadow brightness maps to a horizontal direction and black clipping point maps to vertical direction).

Furthermore, at the third sensor location 504c, the digital image enhancement system 110 detects a third feature 506c. In particular, the digital image enhancement system 110 determines that the digital content at the third sensor location 504c corresponds to a highlight tone. In response, the digital image enhancement system 110 can select a fifth parameter 516 (highlight brightness) and a sixth parameter 518 (white clipping point) with corresponding directions (i.e., horizontal and vertical respectively).

Accordingly, the digital image enhancement system 110 can select a variety of different parameters based on detecting different features at different sensor locations. Although FIG. 5 illustrates the digital image enhancement system 110 selecting particular parameters in response to detecting particular features, the digital image enhancement system 110 can select a variety of different parameters in response to detecting a variety of different features. For example, in response to detecting an orange color, the digital image enhancement system 110 can select an orange brightness parameter (that defines and/or modifies the brightness of orange colors in a digital image) and an orange hue parameter (that defines and/or modifies the hue of orange colors in a digital image). Moreover, in some embodiments, the digital image enhancement system 110 selects parameters without detecting features of the digital image. For example, in some embodiments, the digital image enhancement system 110 selects a contrast parameter independently of any features of the digital image, such as in response to a user selection of a parameter to modify.

As discussed above, the digital image enhancement system 110 can determine modifications based on features (detected at a sensor location) and user input gestures in multiple directions across a digital image. For example, upon mapping parameters to particular movement directions, the digital image enhancement system 110 can then monitor user input gestures and modify parameter values based on the user input gestures. In this manner, the digital image enhancement system 110 can efficiently and accurately generate digital image enhancements that would traditionally require modification of a variety of user interface control tools. For example, FIG. 6 illustrates generating a modification based on features and user input gestures in accordance with one or more embodiments of the digital image enhancement system 110 (and corresponding changes to sliders or other conventional user interface tools for the same modification).

Figure 6:
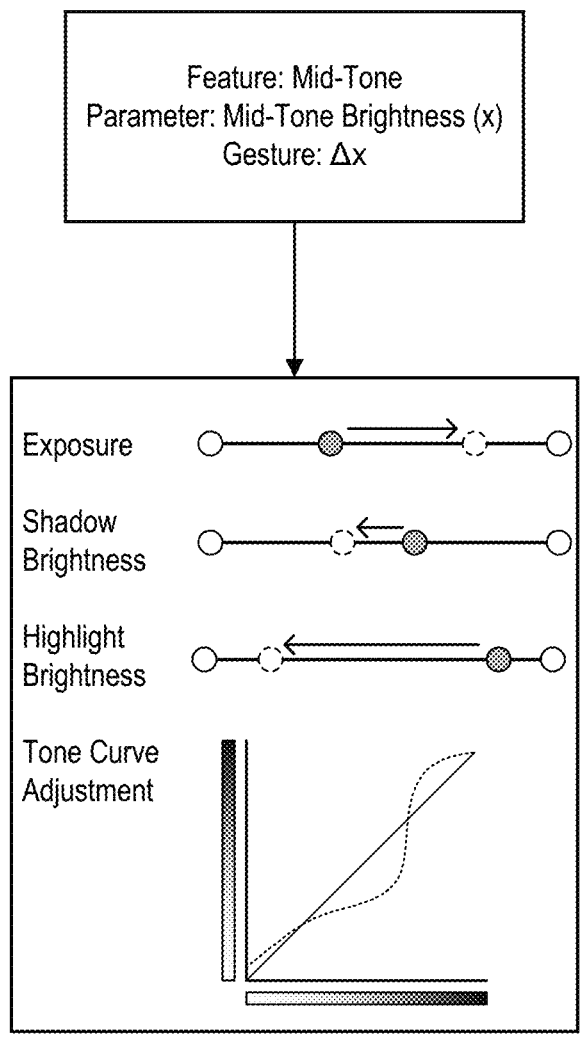
FIG. 6 illustrates modifying parameters specific to a feature detected in a digital image at a sensor location in accordance with one or more embodiments.

For example, in FIG. 6, the digital image enhancement system 110 detects that a sensor location of a digital image includes green colors that lie within a mid-tonal range of intensity values (e.g., a "mid-tone" feature). The digital image enhancement system 110 selects a mid-tone brightness parameter and maps the mid-tone brightness parameter to movement in a horizontal direction. Moreover, the digital image enhancement system 110 detects a user input gesture that includes horizontal movement. In response, the digital image enhancement system 110 modifies the mid-tone brightness proportionate to the magnitude of the horizontal movement.

As shown, modifying the mid-tone brightness of an image pursuant to this example correlates to modification of a host of sliders or other user visual parameter value modification elements. For example, moving an exposure slider will brighten an image, but this will impact not only the mid-tones but have an effect over the whole tonal region. Accordingly, this modification could also involve moving a shadow slider and a highlight slider to impact the mid-tones.

Moreover, modifying brightness within the specific tonal range can also include modifications to a color curve. A color curve (as shown in FIG. 6) includes a visual representation of a remapping of image tonality. A color curve can be expressed as a function of input level to output level. Users can interact with color curves to modify the function, for example, by modifying the function in certain tonal ranges. A user can modify a variety of variables with respect to a color curve, such as: adding, moving, or removing points that define a color curve, modify the range of tonal regions in a color curve, or modifying the intensity within particular tonal ranges. The digital image enhancement system 110 can make intuitive modifications to variables of a color curve without confusing users with presenting a color curve for display.

Indeed, the digital image enhancement system 110 can make the modifications illustrated in FIG. 6 with gesture inputs across a digital image. Indeed, by determining a specific parameter (mid-tone brightness) based on features of the digital image itself, the digital image enhancement system 110 can control and modify the relevant parameters to accurately modify the digital image without the need for duplicative user interactions with a variety of different sliders and visual elements.

Although FIGS. 5-6 describe selecting parameters based on different detected tonal regions (i.e., different brightness features), as mentioned above, the digital image enhancement system 110 can select parameters based on any features described herein. For example, the digital image enhancement system 110 can select a parameter based on an object detected in a digital image (e.g., upon detecting a flower, select a saturation parameter). Similarly, as mentioned above (in relation to FIG. 2), in some embodiments, the digital image enhancement system 110 selects parameters based on applying a digital image correction algorithm.

Figure 7:
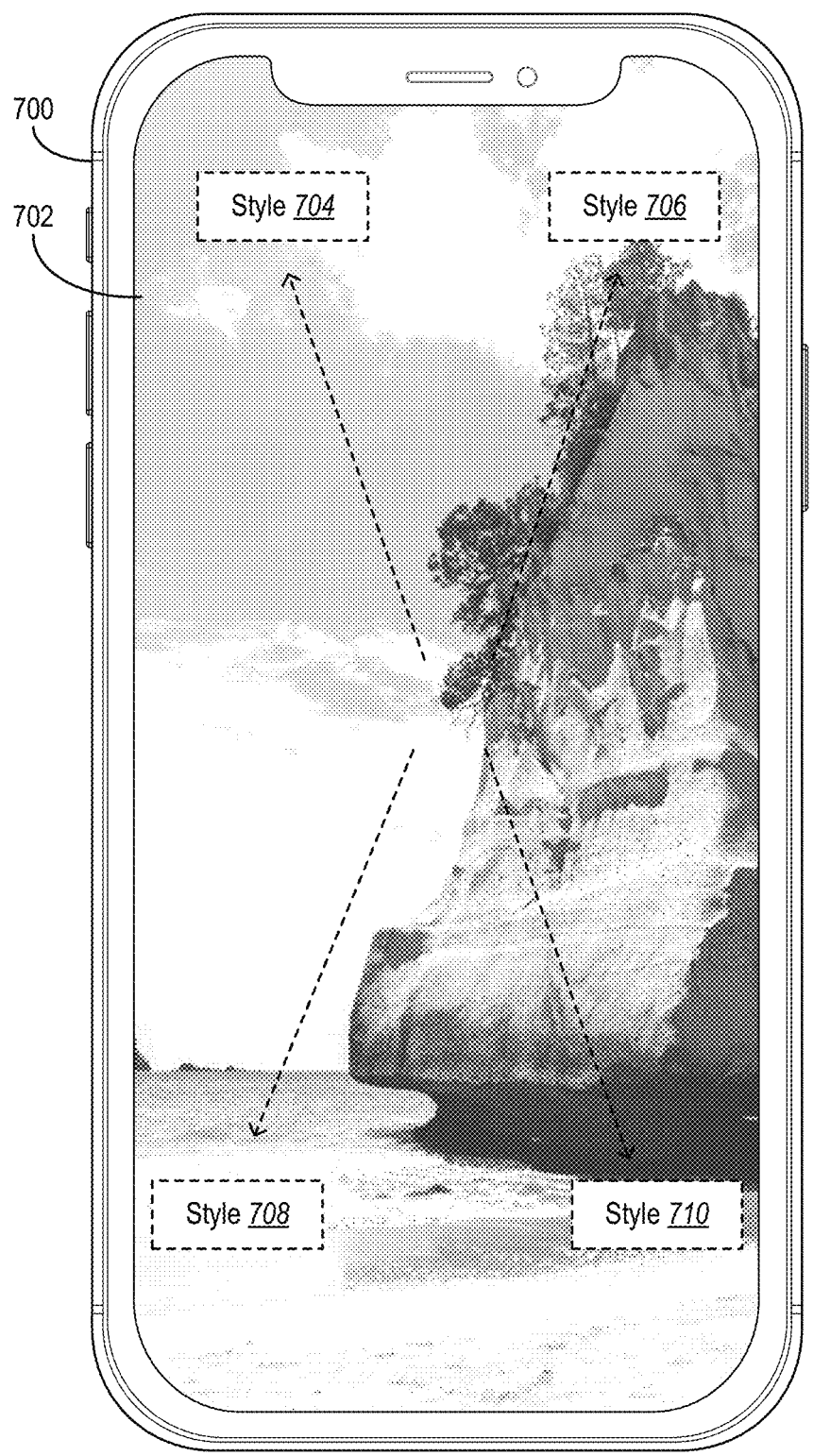
FIG. 7 illustrates modifying one or more parameters based on a user input gesture across a digital image and a plurality of styles in accordance with one or more embodiments.

As mentioned above, in some embodiments, the digital image enhancement system 110 can modify parameters of a digital image by blending styles or filters based on user input gestures across a digital image. For example, FIG. 7 illustrates a computing device 700 with a digital image enhancement user interface 702. The digital image enhancement system 110 can associate regions, locations, and/or directions of the digital image enhancement user interface 702 with four styles 704-710. Each style has its own blend of individual parameters. For example, Style 704 can include a style defined by a user. Similarly, Styles 706-710 can include system pre-defined filters. Based on user interaction, the digital image enhancement system 110 can blend parameters of the four styles 704-710.

For example, in one or more embodiments, the digital image enhancement system 110 performs a weighted blending based on a decreasing function of distance from each style (e.g., distance-weighted blending). Thus, as a user input gesture goes closer to the corners, the digital image enhancement system 110 can emphasize the style corresponding to that corner. When a user input gesture is equidistant from the four corners corresponding to the styles, the digital image enhancement system 110 can equally blend the parameters of the individual styles.

In some embodiments, the digital image enhancement system 110 can blend parameters from different styles using a blended color lookup table. For example, the digital image enhancement system 110 can determine a blended color lookup table by blending the color outputs for any specified input color. For instance, the digital image enhancement system 110 can generate a lookup table for each of the styles 704-710 where each lookup table identifies an output color corresponding to an input color from the digital image. The digital image enhancement system 110 can take the output colors from each lookup table for each style to create a blended color lookup table. The digital image enhancement system 110 can utilize the blended color lookup table to identify a blended color from an input color.

In some embodiments, the digital image enhancement system 110 utilizes a zero-style at a center region of the digital image. Thus, when a user finger is in the center region, the digital image enhancement system 110 applies none of the styles 704-710. In other embodiments, the digital image enhancement system 110 includes an auto correction element at a center region of the digital image. In such embodiments, when a user finger is in the center region, the digital image enhancement system 110 applies a digital image correction algorithm (rather than one of the four styles).

Although FIG. 7 illustrates the four styles 704-710 with corresponding regions at the corners of the digital image enhancement user interface, the digital image enhancement system 110 can utilize a different number of styles with different corresponding locations. For example, rather than blending four styles, the digital image enhancement system 110 can blend two styles and associate the two styles with different locations or directions (e.g., top and bottom of the screen or locations along the edge of the screen). To illustrate, the digital image enhancement system 110 can associate style locations along a digital image boundary within the interior of the digital image or outside of the digital image. Moreover, rather than associating styles with corners, in some embodiments the digital image enhancement system 110 associates a first blending weight for a first style with a first (horizontal) movement direction and a second blending weight for a second style with a second (vertical) movement direction.

Figure 8:
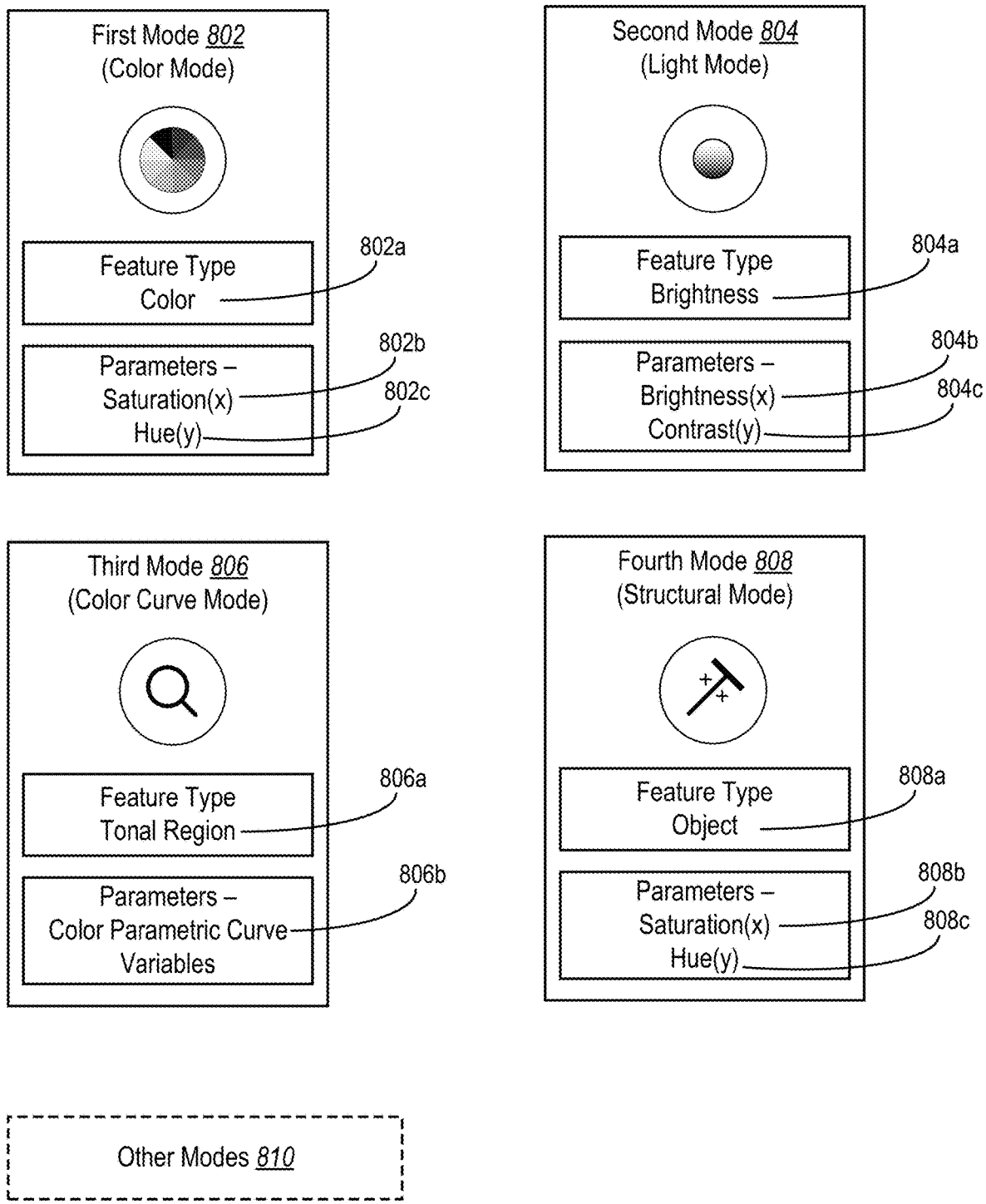
FIG. 8 illustrates various input modes utilized to generated enhanced digital images in accordance with one or more embodiments.

As mentioned above, the digital image enhancement system 110 can also utilize various input modes to assist in selecting particular features and/or parameters. For example, FIG. 8 illustrates input modes 802-810 utilized by the digital image enhancement system 110 in accordance with one or more embodiments. The digital image enhancement system 110 can select and apply the input modes 802-810 in generating enhanced digital images. For example, in response to a mode selection user input, the digital image enhancement system 110 can select the first mode 802 and then search for features corresponding to a feature type corresponding to the first mode and modify parameters corresponding to the first mode.

For example, as illustrated, the first mode 802 is associated with a feature type 802a (i.e., a color or hue feature). In addition, the first mode 802 is associated with parameters 802b-802c. In particular, the first mode 802 is associated with a first parameter 802b (i.e., saturation) corresponding to a first direction (i.e., a horizontal direction). Moreover, the first mode 802 is associated with a second parameter 802c (i.e., hue) corresponding to a second direction (i.e., a vertical direction). Accordingly, upon selection of the first mode 802, the digital image enhancement system 110 can analyze a sensor location for color and modify saturation based on a user input gesture that includes movement in a horizontal direction and modify hue based on a user input gesture that includes movement in a vertical direction.

In some embodiments, the digital image enhancement system 110 varies the parameters 802b, 802c based on the specific feature detected. For example, in utilizing the first mode 802, the digital image enhancement system 110 can detect green as a color at a sensor location. In response, the digital image enhancement system 110 can utilize the first parameter 802b, but utilize a more specific version of the first parameter 802b that modifies saturation of green colors. Thus, although the first mode 802 corresponds to particular parameters, the digital image enhancement system 110 can apply the parameters based on features detected within the digital image.

As shown in FIG. 8, the digital image enhancement system 110 can also utilize a second mode 804. As shown in FIG. 8, the second mode 804 can include a feature type 804a (i.e., a color feature) a first parameter 804b (i.e., brightness) corresponding to a first direction (i.e., horizontal direction) and a second parameter 804c corresponding to a second direction (i.e., a vertical direction). Accordingly, in applying the input mode 804, the digital image enhancement system 110 can analyze a sensor location for color and then modify brightness (in response to movement in a horizontal direction) and modify saturation (in response to movement in a vertical direction).

As further illustrated in FIG. 8, the digital image enhancement system 110 can utilize a third mode 806 associated with a features type 806*a* (i.e., tonal region feature) and parameters 806*b* (i.e., color parametric curve variables). As discussed above (e.g., in relation to FIG. 6), the digital image enhancement system 110 can utilize a color curve to modify a digital image. For instance, the digital image enhancement system 110 can modify intensity values within a tonal region of a color curve. Similarly, the digital image enhancement system 110 can modify boundaries or cut-off points between tonal regions within a color curve. The digital image enhancement system 110 can utilize these variables as the parameters 806*b*. For example, the digital image enhancement system 110 can modify the intensity (or height) of a color curve based on movement in a first direction. Moreover, the digital image enhancement system 110 can modify a boundary of a tonal region (or horizontal location of points on a color curve) based on movement in a second direction.

As shown in FIG. 8, the digital image enhancement system 110 can also include a fourth mode 808 (i.e., a structural mode) associated with a feature type 808*a* (i.e., detect an object) a first parameter 808*b* (i.e., saturation) and a second parameter 808*c* (i.e., hue). Thus, when implementing the fourth mode 808, the digital image enhancement system 110 can identify an object portrayed in a sensor location, modify saturation of the object (and/or similar objects of the same class) in response to a movement in a horizontal direction and modify hue of the object (and/or similar objects of the same class) in response to a movement in a vertical direction.

Moreover, FIG. 8 shows that the digital image enhancement system 110 can also apply other modes 810. For example, the digital image enhancement system 110 can define a variety of modes based on different combinations of features and parameters described herein. To illustrate, the digital image enhancement system 110 can utilize a mode that detects features that include both color and saturation and that modifies hue and saturation (or hue and brightness or hue and contrast). Similarly, the digital image enhancement system 110 can utilize style input mode that modifies preset styles (as described in relation to FIG. 7). Moreover, although FIG. 8 illustrates various input modes having a pre-determined feature type to analyze, in some embodiments the digital image enhancement system 110 utilizes input modes that do not specify (or analyze) a feature type (i.e., the input modes only specify parameters).

In one or more embodiments, the digital image enhancement system 110 selects or determines a mode to apply (e.g., from the modes 802-810). The digital image enhancement system 110 can select a mode based on a variety of factors. For example, in some embodiments, the digital image enhancement system 110 selects a mode based on user input. For instance, the digital image enhancement system 110 can detect a mode selection user input that indicates a user selection of a particular node. To illustrate, in some embodiments, the digital image enhancement system 110 toggles through input modes based on a double-click or double-press event.

The digital image enhancement system 110 can also select an input mode based on digital image content. For example, the digital image enhancement system 110 can perform a preliminary analysis of a digital image to determine digital image features (e.g., color statistics, objects portrayed, time of day, seasons, or location) and select an input mode based on the digital image features. For example, based on detecting a digital with a dark color profile, the digital image enhancement system 110 can select a light color mode. Similarly, based on detecting a digital image with little variation in color, the digital image enhancement system 110 can select a color mode.

In some embodiments, the digital image enhancement system 110 can select an input mode based on applying a digital image correction algorithm. For example, the digital image enhancement system 110 can apply a digital image correction algorithm and determine parameters that change (e.g., that change the most significantly) relative to the original digital image. The digital image enhancement system 110 can then select a color mode that corresponds to the parameters that change.

The digital image enhancement system 110 can also select an input mode based on historical usage. For example, the digital image enhancement system 110 can select an input made based on a last-used input mode. Similarly, the digital image enhancement system 110 can select an input mode based on frequency of use (e.g., the most used input mode for a particular user). In some embodiments, the digital image enhancement system 110 can select an input mode based on both features of the digital image and usage history. For example, the digital image enhancement system 110 can detect an object in a digital image and determine that a user has previously modified a digital image with the object utilizing a particular input mode. In response, the digital image enhancement system 110 can select the particular input mode.

Figure 9A:
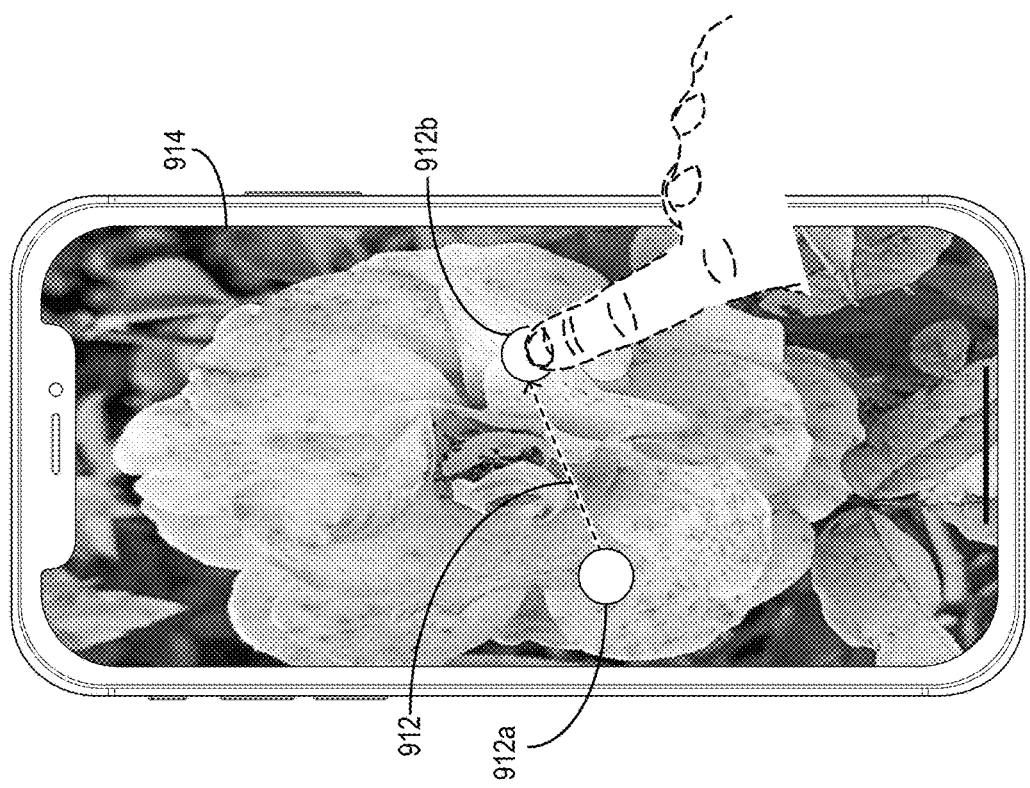
FIGS. 9A-9B illustrate a digital image enhancement user interface for generating enhanced digital images in accordance with one or more embodiments.
Figure 9A:
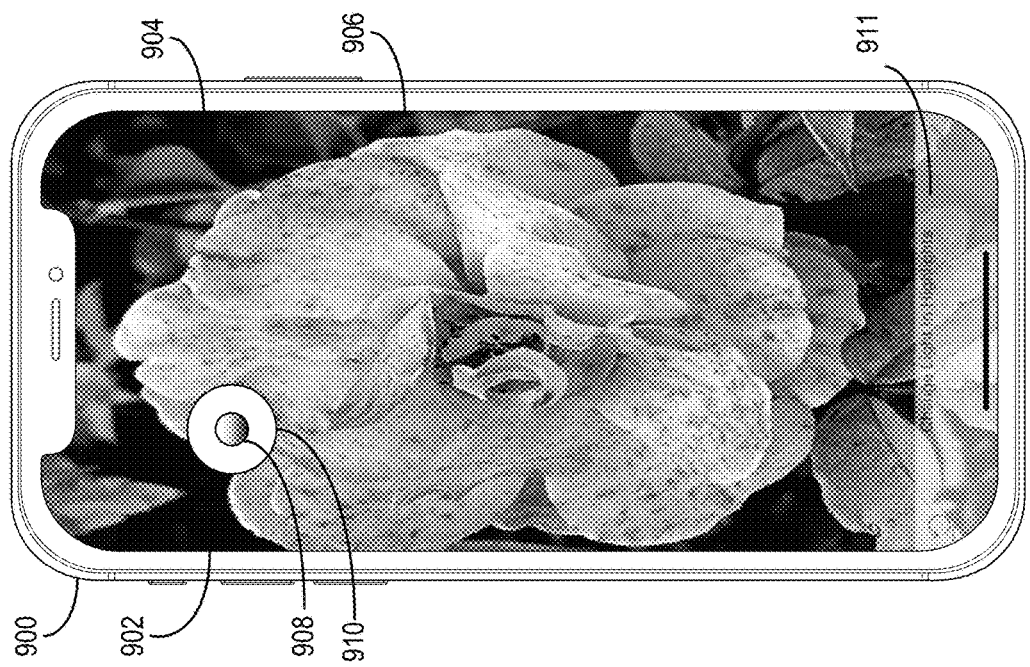
Figure 9B:
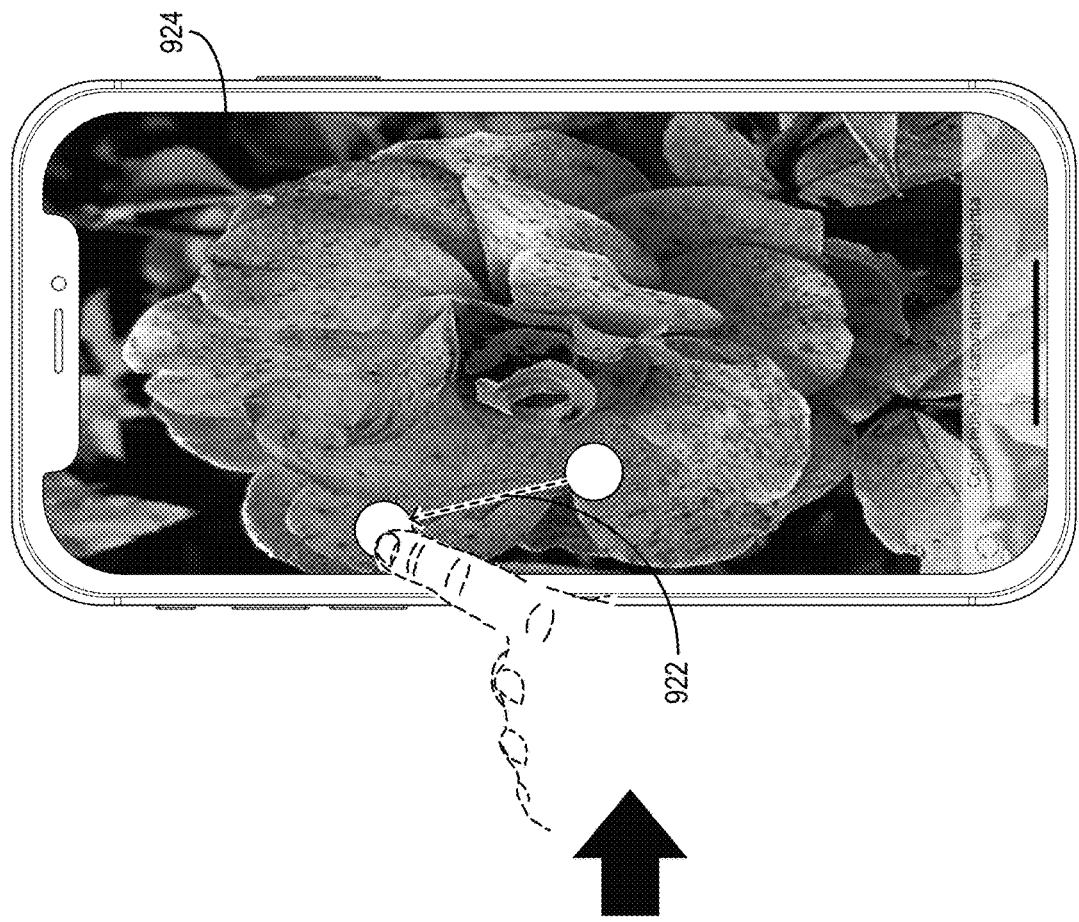
Figure 9B:
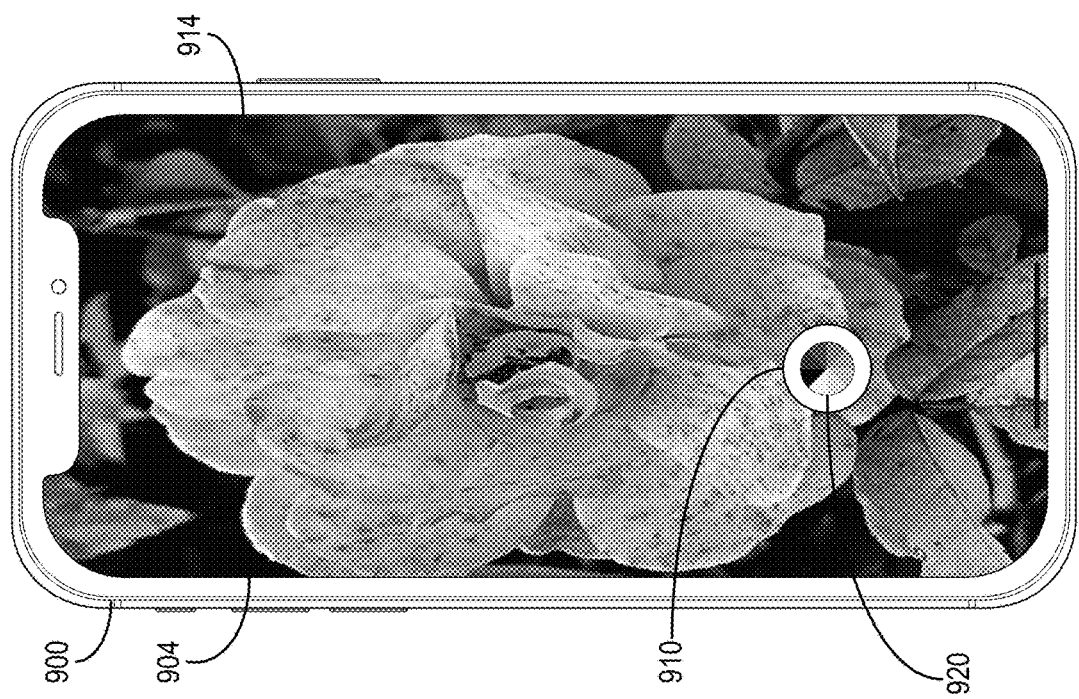
Figure 10:
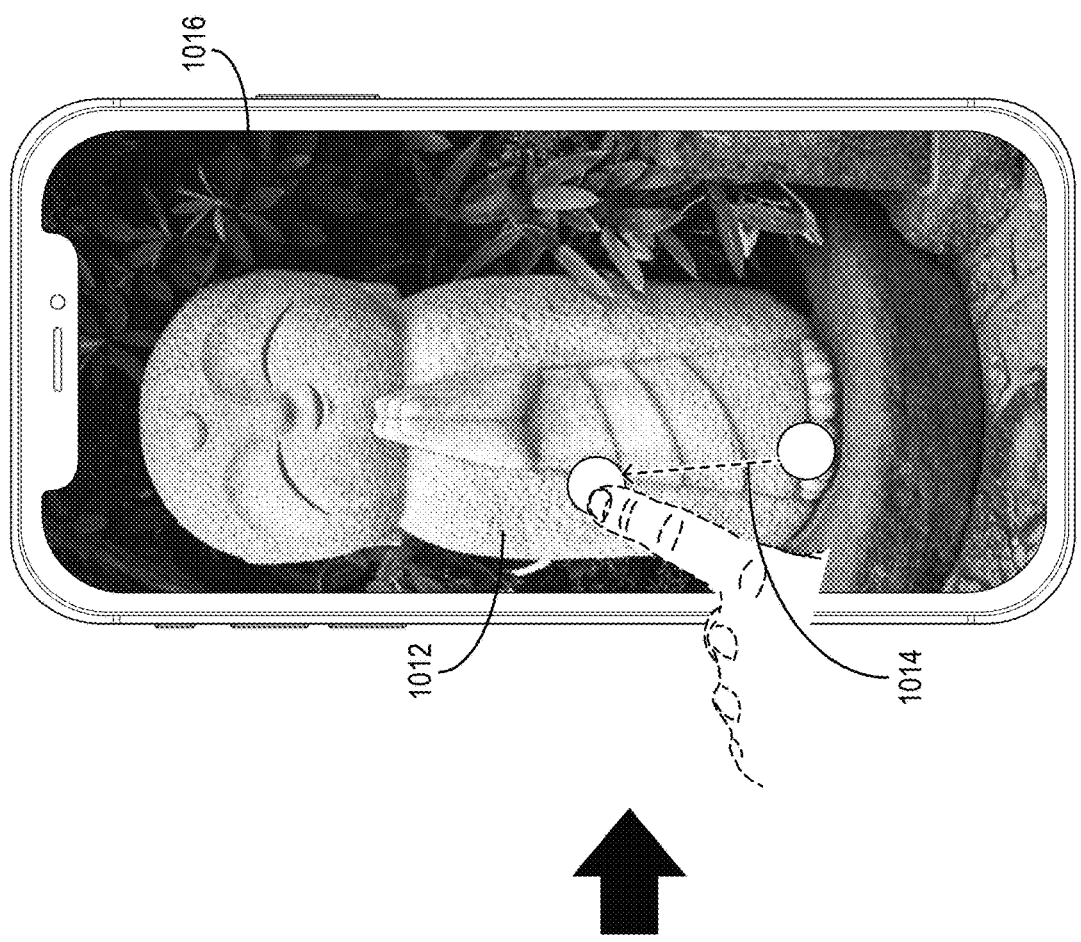
FIG. 10 illustrates a digital image enhancement user interface for generating an enhanced digital image in accordance with one or more embodiments.
Figure 10:
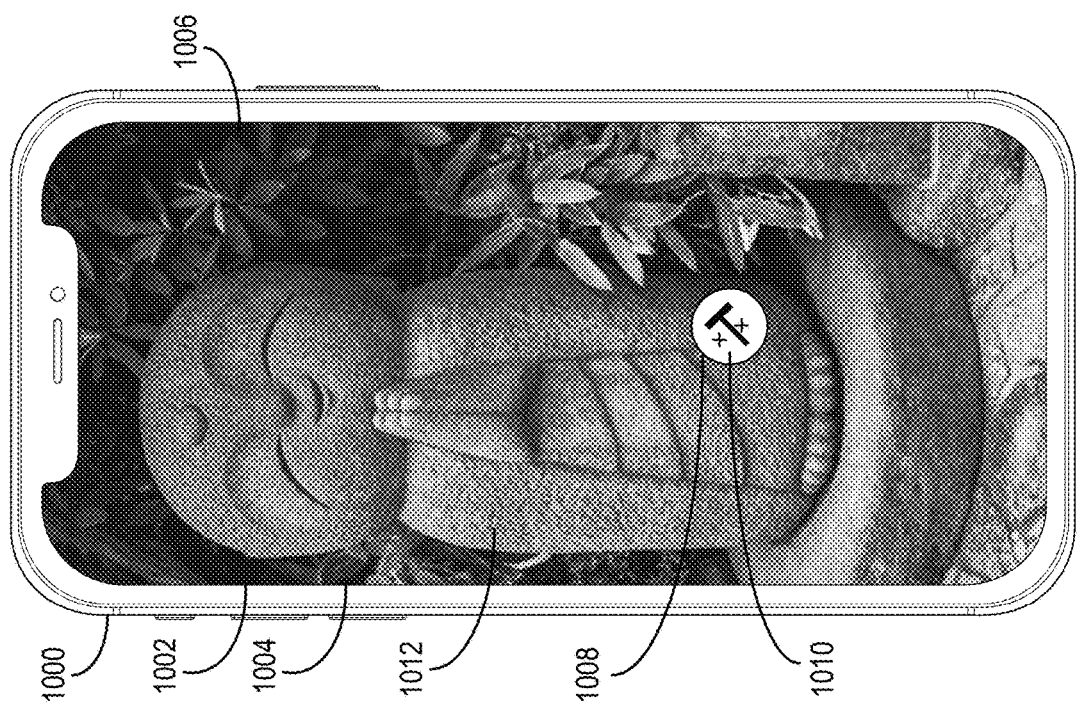

As mentioned above, the digital image enhancement system 110 can utilize a digital image enhancement user interface to generate enhanced digital images. FIGS. 9A-10 illustrate generating enhanced digital images utilizing a digital image enhancement user interface in accordance with one or more embodiments. For example, FIG. 9A illustrates a computing device 900 with a touchscreen 902 displaying a digital image enhancement user interface 904 that includes a digital image 906 (i.e., a digital image portraying a flower).

The digital image enhancement system 110 detects a user dragging a finger to a first location 908. The digital image enhancement system 110 provides a sensor 910 for display on the digital image enhancement user interface (as the user drags the finger). In some embodiments, the digital image enhancement system 110 increases the size of the sensor 910 when a user touches the display screen (to make the location of the sensor easier to see at any given time). Moreover, as the digital image enhancement system 110 detects movement of the sensor 910 at different locations, the digital image enhancement system 110 can provide an indicator of content at the different locations (and modifications corresponding to a currently selected input mode). For example, as shown in FIG. 9A, the digital image enhancement system 110 provides a dynamic indicator 911 indicating that digital content at the current location includes "Highlights" and the current input mode will modify light (e.g., brightness and contrast) within the highlights.

Specifically, as shown in FIG. 9A, the sensor 910 is associated with an input mode. Specifically, the sensor 910 displays a graphic (e.g., a circle with a lightness gradient) indicating that a light input mode is selected. Based on the light input mode, the digital image enhancement system 110 can detect a brightness feature at the first location 908. For example, the digital image enhancement system 110 detects that the digital image 906 at the first location 908 includes pixels that correspond to highlights (e.g., in a highlight brightness category or range).

At the first location 908, the digital image enhancement system 110 can detect a long-press or other user input to activate the sensor or feature detector capabilities of the digital image enhancement system 110. The digital image enhancement system 110 can detect one or more features of the digital image at the first location 908. In particular, the digital image enhancement system 110 can identify parameters to modify and associate those parameters with movement directions. Because the digital image enhancement system 110 is applying a light input mode, the digital image enhancement system 110 can associate a brightness parameter (e.g., change brightness of pixels portraying highlights) with movement in a horizontal direction and a saturation parameter (e.g., change saturation of pixels portraying highlights) with a movement in a vertical direction.

As illustrated in FIG. 9A, the digital image enhancement system 110 detects a user input gesture 912. In particular, after the selection of the first location 908, the digital image enhancement system 110 detects a user input gesture that begins at an initial location 912a and ends at a subsequent location 912b. From the user input gesture 912, the digital image enhancement system 110, in one embodiment, can identify a first movement in a horizontal direction and a second movement in a vertical direction. Based on the first movement in the horizontal direction and the features at the first location, the digital image enhancement system 110 can modify brightness. Specifically, the digital image enhancement system 110 can modify brightness of pixels that fall within the highlight category or range. Based on the second movement in the vertical direction and the features at the first location, the digital image enhancement system 110 can also modify saturation. In particular, the digital image enhancement system 110 can modify saturation of pixels that fall within the highlight category or range. As discussed above, the digital image enhancement system 110 can determine the magnitude of the brightness and saturation changes based on the magnitude of the horizontal movement and the magnitude of the vertical movement.

In another embodiment, the digital image enhancement system 110 can determine that the user input gesture 912 is more horizontal than vertical or within a threshold angle of a horizontal movement. In response, the digital image enhancement system 110 can modify brightness of pixels that fall within the highlight category or range based on a magnitude of the first user input gesture 912.

Upon identifying a modification to be made (e.g., parameters and parameter values to change), the digital image enhancement system 110 can generate an enhanced digital image. Upon detecting the user input gesture 912, the digital image enhancement system 110 can modify the parameters to generate an enhanced digital image 914. Specifically, the digital image enhancement system 110 can modify brightness (and optionally saturation) of pixels within a highlights tonal range. Moreover, the digital image enhancement system 110 can provide the enhanced digital image 914 for display via the digital image enhancement user interface 904.

As mentioned, the digital image enhancement system 110 can iteratively change different parameters utilizing a sensor. For example, FIG. 9B illustrates utilizing a sensor and multi-dimensional gesture inputs to further modify the enhanced digital image 914. Specifically, in relation to FIG. 9B, the digital image enhancement system 110 identifies movement (e.g., a drag event) to a new location 920. The digital image enhancement system 110 also identifies user input (e.g., a double-press event) indicating a change to a different input mode. In response, the digital image enhancement system 110 can provide the sensor 910 for display at the new location 920. Moreover, the digital image enhancement system 110 can provide a new graphic within the sensor 910 indicating a different input mode (i.e., a color input mode).

Based on an additional user input (e.g., a long press event), the digital image enhancement system 110 can activate the sensor 910, determine features of the digital image at the new location 920, and search or wait for a user input gesture. Because the digital image enhancement system 110 is applying a color input mode, the digital image enhancement system 110 can detect a color at the first location (i.e., magenta). The digital image enhancement system 110 also can identify parameters corresponding to the color input mode (e.g., hue for a horizontal direction and saturation for a vertical direction).

As shown in FIG. 9B, the digital image enhancement system 110 identifies a user input gesture 922. The digital image enhancement system 110 determines a first movement in a horizontal direction and applies a corresponding change in hue based on the feature detected at the new location 920 and the first movement. Specifically, the digital image enhancement system 110 identifies pixels that portray hues within a threshold hue range of magenta and applies a change in hue to those pixels. Moreover, the digital image enhancement system 110 determines a second movement in a vertical direction and applies a corresponding change in saturation based on the feature detected at the new location 920 and the second movement. Specifically, the digital image enhancement system 110 identifies pixels within the threshold hue range of magenta and applies a change in saturation to those pixels. As illustrated, the digital image enhancement system 110 generates an enhanced digital image 924.

Although FIGS. 9A-9B illustrate applying to modifications to a digital image, as discussed above, the digital image enhancement system 110 can iteratively modify a digital image by identifying features at a sensor location and detecting two-dimensional user input gestures. For example, the digital image enhancement system 110 can detect an additional selection at an additional location using the sensor 910, identify additional features at the additional location, determine additional user input gestures, and modify the enhanced digital image 916 based on the detected features and the additional user input gestures.

As mentioned above, in some embodiments, the digital image enhancement system 110 can detect objects portrayed in a digital image at a sensor location and modify the objects based on user input gestures across the digital image. For example, FIG. 10 illustrates a computing device 1000 with a touchscreen 1002 displaying a digital image enhancement user interface 1004 that includes a digital image 1006 (i.e., a digital image portraying a statue 1012).

The digital image enhancement system 110 identifies a user selection at a first location 1008 (e.g., a long press event) corresponding to a sensor 1010. In response, the digital image enhancement system 110 can determine features at the first location 1008. As illustrated, the digital image enhancement system 110 can utilize a structural input mode in relation to FIG. 10. Accordingly, the digital image enhancement system 110 can detect an object portrayed at the first location 1008. Specifically, the digital image enhancement system 110 can apply an object identification model and identify the statue 1012.

As discussed above, the digital image enhancement system 110 can also map parameters to particular movement directions. For example, in relation to FIG. 10, the digital image enhancement system 110 can associate saturation to a horizontal direction and hue to a vertical direction.

As shown in FIG. 10, the digital image enhancement system 110 also detects a user input gesture 1014. In response, the digital image enhancement system 110 can modify parameters of the digital image based on the detected object and the user input gesture. In particular, in the embodiment shown in FIG. 10, the digital image enhancement system 110 modifies saturation of the statue 1012 based on movement in a horizontal direction and modifies hue of the statue 1012 based on movement in a vertical direction. As shown, the digital image enhancement system 110 generates and displays an enhanced digital image 1016.

Although FIG. 10 illustrates a digital image portraying an object of a particular type or class, the digital image enhancement system 110 can operate in conjunction with a variety of digital images portraying a variety of objects. For example, in some embodiments, the digital image enhancement system 110 detects a sky or clouds portrayed at a sensor location in a digital image. The digital image enhancement system 110 can modify the sky or the clouds based on user input gestures.

Moreover, in some embodiments, digital images portray multiple instances of an object in a digital image. In some embodiments, the digital image enhancement system 110 can detect a single instance of an object at a sensor location, identify a plurality of instances of the object in the digital image, and modify the plurality of instances of the object based on user input gestures. To illustrate, the digital image enhancement system 110 can detect a first face at a sensor location. The digital image enhancement system 110 can analyze a digital image and detect a second face in the digital image. In response to a user input gesture, the digital image enhancement system 110 modify the first face and the second face (e.g., modify hue, brightness, or saturation of the first face and the second face).

The digital image enhancement system 110 can also place limits on parameter values based on features detected in a digital image. For example, in response to detecting a face in a digital image, the digital image enhancement system 110 can place limits on hue values within a range corresponding to human skin tones. Similarly, upon detecting a sky in a digital image, the digital image enhancement system 110 can select a range of hue values that correspond to traditional sky colors.

Furthermore, in addition to the features identified in FIGS. 9A-10, the digital image enhancement system 110 can identify and modify digital images based on other features. For example, as mentioned above, the digital image enhancement system 110 can detect a time or location within a digital image and select parameters to modify based on the time or location. For example, the digital image enhancement system 110 can determine that a digital image portrays spring. In response, the digital image enhancement system 110 can select a color parameter (e.g., to emphasize colors of spring flowers). Similarly, the digital image enhancement system 110 can determine that London is portrayed in a digital image and select a brightness parameter (e.g., to brighten dark regions).

Figure 11:
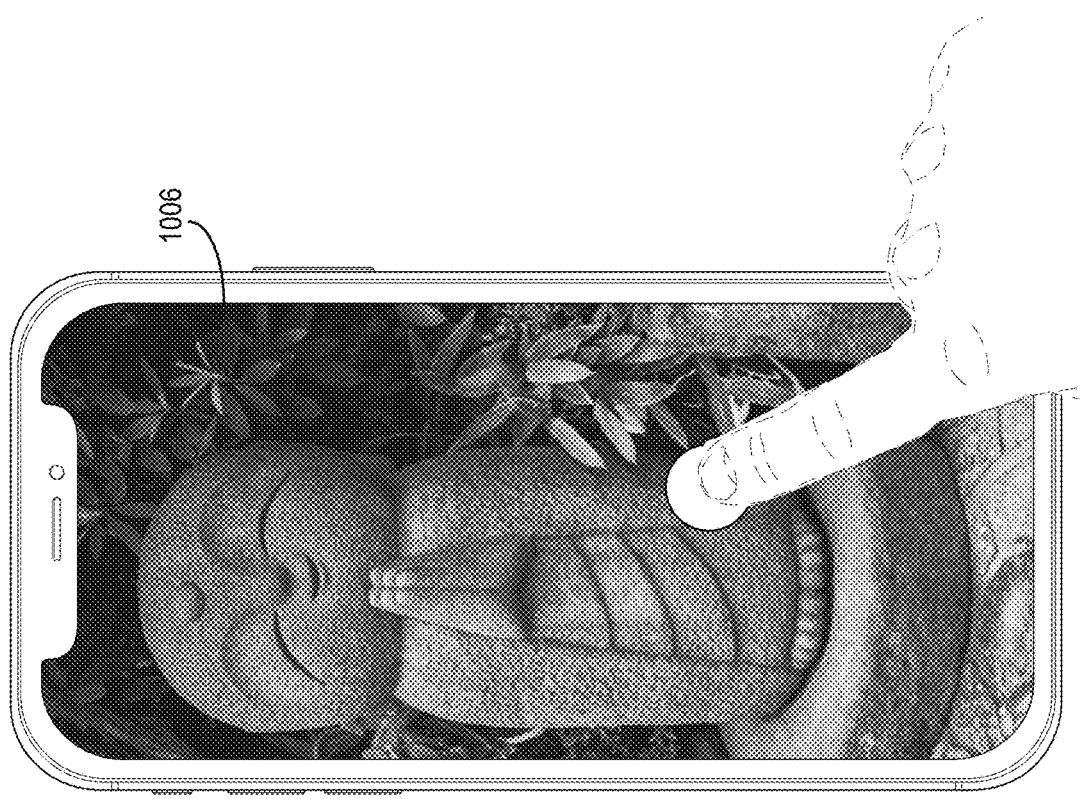
FIG. 11 illustrates a digital image enhancement user interface transitioning between displaying a digital image and displaying an enhanced digital image in accordance with one or more embodiments.
Figure 11:
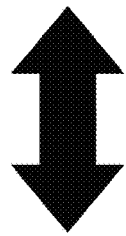
Figure 11:
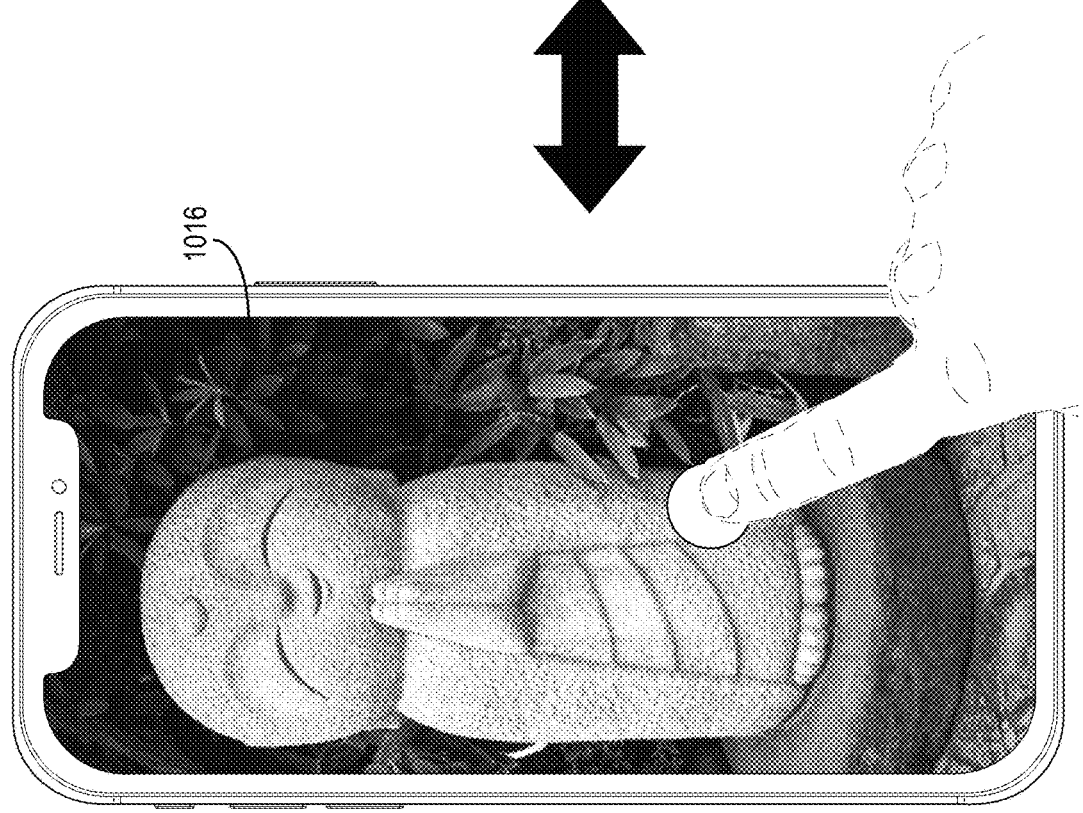

The digital image enhancement system 110 can also provide additional user interface functions that assist in generating enhanced digital images. For example, in some embodiments, the digital image enhancement system 110 alternate between displaying a modified digital image and a previous (e.g., original) digital image (e.g., to assist users in evaluating modifications). FIG. 11 illustrates alternating between displaying a modified digital image and a previous digital image in accordance with one or more embodiments. As shown in FIG. 11, the digital image enhancement system 110 displays the enhanced digital image 1016. In response to user input (e.g., a long press event), the digital image enhancement system 110 can display the digital image 1006 (prior to modifications). Specifically, the digital image enhancement system 110 displays the digital image 1006 for the duration of the user input (e.g., until the long press event is complete). Upon completion of the user input, the digital image enhancement system 110 displays the enhanced digital image 1016.

The digital image enhancement system 110 can provide a variety of other user interface functions to assist in modifying digital images. For example, in response to user input, the digital image enhancement system 110 can provide details of modifications to a digital image. To illustrate, the digital image enhancement system 110 can provide a text element that indicates modifications to various parameters (e.g., modifications to brightness or saturation).

For example, the digital image enhancement system 110 can provide visual elements within a user interface that provide visual feedback as to the values of the parameters. For example, in some embodiments, the digital image enhancement system 110 can show numeric parameter values as text, either near the sensor or near the finger location for touch screens or in a separate fixed location (e.g., at the top or bottom of the view screen). The user can scrub a finger over the text (or provide some other user input) to increase or decrease values and can alternatively enter text values for the parameters directly. Also, the digital image enhancement system 110 can allow for textual feedback as to the specific user mode and type of parameters which are being controlled along the two axes. Such visual feedback may include graphical depictions, such as a change of icon for the sensor visual element. It may also include a visual display of parameter values, such as presentation of a bar whose length indicates parameter strength. In this manner, the digital image enhancement system 110 can inform users regarding what changes are being made (or have been made) in generating an enhanced digital image.

Figure 12:
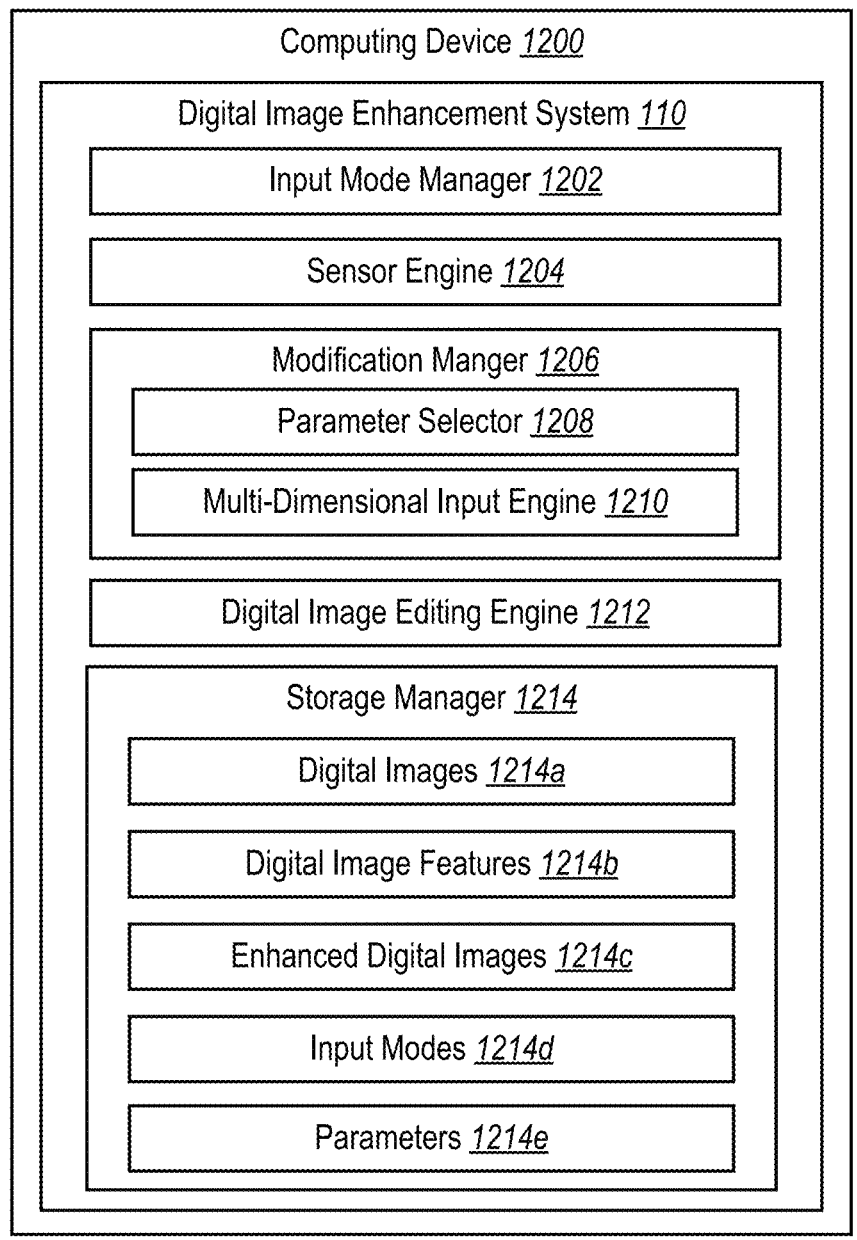
FIG. 12 illustrates a schematic diagram of a digital image enhancement system in accordance with one or more embodiments.

Turning now to FIG. 12, additional detail is provided regarding components and capabilities of the digital image enhancement system 110 in accordance with one or more embodiments. As shown, the digital image enhancement system 110 is implemented by a computing device 1200 (e.g., the server device(s) 102 and/or the client device 104a). Moreover, as illustrated, the digital image enhancement system 110 includes an input mode manager 1202, a sensor engine 1204, a modification manager 1206 (which includes a parameter selector 1208 and a multi-dimensional input engine 1210), and a storage manager 1214 (which stores digital images 1214a, digital image features 1214b, enhanced digital images 1214c, input modes 1214d, and parameters 1214e).

As just mentioned, the digital image enhancement system 110 includes the input mode manager 1202. The input mode manager 1202 can determine, generate, apply, implement, modify and/or utilize input modes. For example, as discussed above, the digital image enhancement system 110 can determine input modes that define feature types and/or parameters to utilize in generating an enhanced digital image.

In addition, as shown in FIG. 12, the digital image enhancement system 110 includes the sensor engine 1204. The sensor engine 1204 can generate, display, and/or utilize a sensor (e.g., a transparent sensor). The sensor engine 1204 can also identify, determine, detect, and/or extract features of a digital image (e.g., features corresponding to a sensor location). For example, the sensor engine 1204 can provide a circular transparent sensor for display based on a selection of a sensor location. As described above, the sensor engine 1204 can also apply a color analysis model and/or an object identification model to determine features corresponding to the sensor location.

As illustrated in FIG. 12, the digital image enhancement system 110 also includes the modification manager 1206. The modification manager 1206 can identify, determine, and/or select a modification to apply to a digital image. For instance, the digital image enhancement system 110 can identify parameters and parameter values to utilize in modifying a digital image.

As shown, the modification manager 1206 includes a parameter selector 1208. The parameter selector 1208 can identify, determine, generate, and/or select parameters to modify in a digital image. For instance, the parameter selector 1208 can map parameters to user input gestures. For example, as described above, the parameter selector 1208 can select a first parameter and map the first parameter to a first direction. Moreover, the parameter selector 1208 can select a second parameter and map the second parameter to a second direction.

FIG. 12 illustrates that the modification manager 1206 also includes the multi-dimensional input engine 1210. The multi-dimensional input engine 1210 can identify, determine, detect, and/or analyze user input gestures. For example, the multi-dimensional input engine 1210 can identify a user input gesture to determine movements corresponding to different directions. In particular, the multi-dimensional input engine 1210 can identify a first movement in a first direction and a second movement in a second direction. Furthermore, the multi-dimensional input engine 1210 can determine parameter values based the user input gestures. For example, as described above the multi-dimensional input engine 1210 can determine parameter values for a first parameter based on a movement in a first direction and determine parameter values for a second parameter based on movement in a second direction.

As illustrated, the digital image enhancement system 110 also includes the digital image editing engine 1212. The digital image editing engine 1212 can create, generate, edit, modify, render and/or display an enhanced digital image. For example, the digital image enhancement system 110 can identify modifications (from the modification manager 1206) and make the modifications in relation to a digital image. Moreover, the digital image enhancement system 110 can provide a modified digital image for display.

As shown in FIG. 12, the digital image enhancement system 110 also includes the storage manager 1214. The storage manager 1214 maintains data for the digital image enhancement system 110. The storage manager 1214 can maintain data of any type, size, or kind, as necessary to perform the functions of the digital image enhancement system 110, including digital images 1214*a*, digital image features 1214*b* (e.g., colors or objects portrayed in a digital image at different locations), enhanced digital images 1214*c*, input modes 1214*d* (e.g., color input mode or lighting input mode), and/or parameters 1214*e* (e.g., available parameters to modify and/or a record of historical parameter usage).

In one or more embodiments, each of the components of the digital image enhancement system 110 are in communication with one another using any suitable communication technologies. Additionally, the components of the digital image enhancement system 110 can be in communication with one or more other devices including one or more client devices described above. It will be recognized that although the components of the digital image enhancement system 110 are shown to be separate in FIG. 12, any of the subcomponents may be combined into fewer components, such as into a single component, or divided into more components as may serve a particular implementation. Furthermore, although the components of FIG. 12 are described in connection with the digital image enhancement system 110, at least some of the components for performing operations in conjunction with the digital image enhancement system 110 described herein may be implemented on other devices within the environment.

The components of the digital image enhancement system 110 can include software, hardware, or both. For example, the components of the digital image enhancement system 110 can include one or more instructions stored on a computer-readable storage medium and executable by processors of one or more computing devices (e.g., the computing device 1200). When executed by the one or more processors, the computer-executable instructions of the digital image enhancement system 110 can cause the computing device 1200 to perform the methods described herein. Alternatively, the components of the digital image enhancement system 110 can comprise hardware, such as a special purpose processing device to perform a certain function or group of functions. Additionally or alternatively, the components of the digital image enhancement system 110 can include a combination of computer-executable instructions and hardware.

Furthermore, the components of the digital image enhancement system 110 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital image enhancement system 110 may be implemented as part of a stand-alone application on a personal computing device or a mobile device. Alternatively or additionally, the components of the digital image enhancement system 110 may be implemented in any application that allows creation and delivery of marketing content to users, including, but not limited to, applications in ADOBE CREATIVE CLOUD, such as ADOBE LIGHTROOM, ADOBE ILLUSTRATOR, ADOBE PHOTOSHOP, and ADOBE CAMERA RAW. "ADOBE," "CREATIVE CLOUD," "LIGHTROOM" "ILLUSTRATOR," "PHOTOSHOP," and "ADOBE CAMERA RAW" are trademarks and/or registered trademarks of Adobe Inc. in the United States and/or other countries.

FIGS. 1-12, the corresponding text, and the examples provide a number of different systems, methods, and non-transitory computer-readable media for generating a target distribution schedule for distributing electronic communications to individual users/client devices. In addition to the foregoing, embodiments can also be described in terms of flowcharts comprising acts for accomplishing a particular result. For example, FIGS. 13-14 illustrate flowcharts of example sequences of acts in accordance with one or more embodiments.

Figure 13:
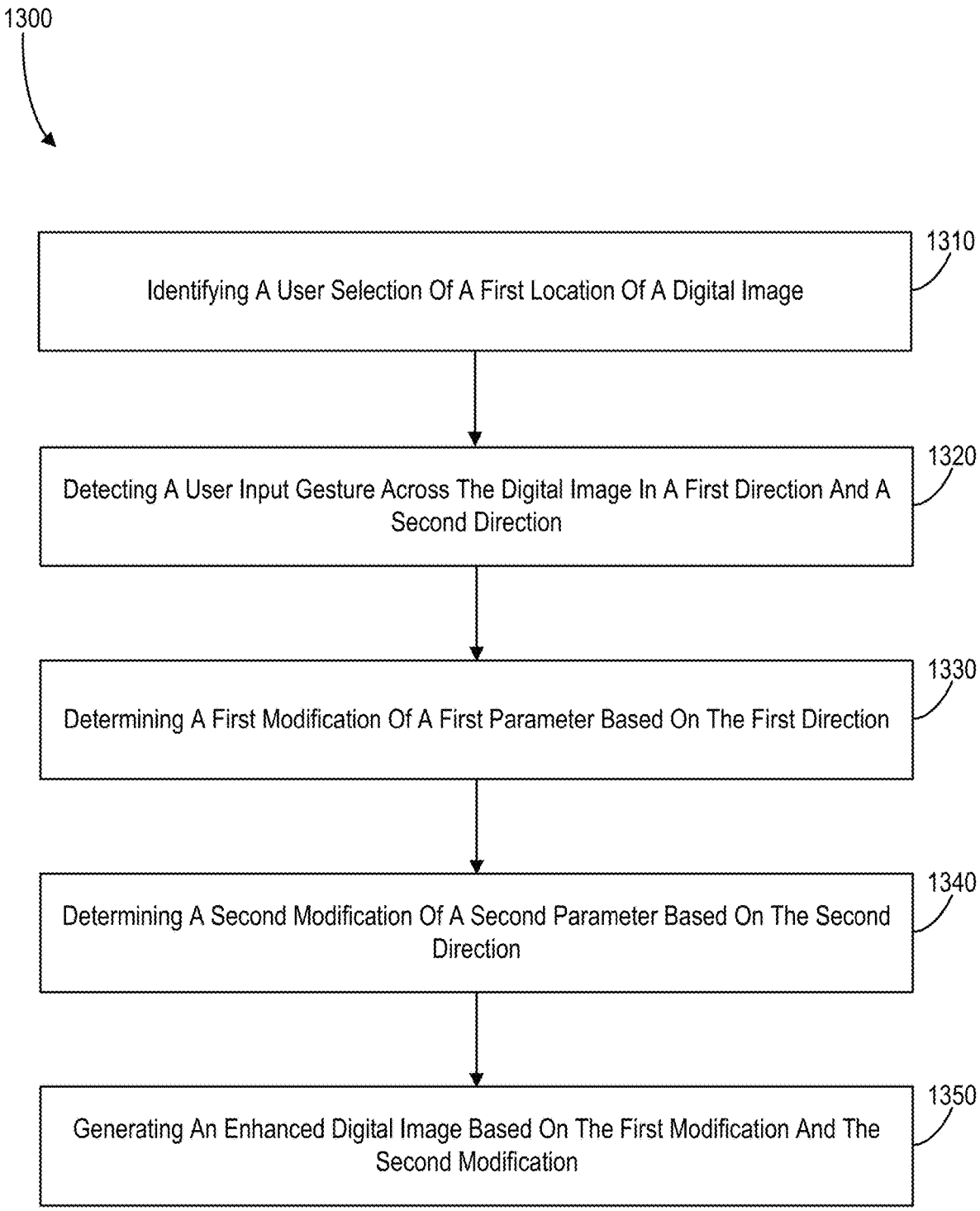
FIG. 13 illustrates a flowchart of a series of acts for generating an enhanced digital image in accordance with one or more embodiments.
Figure 14:
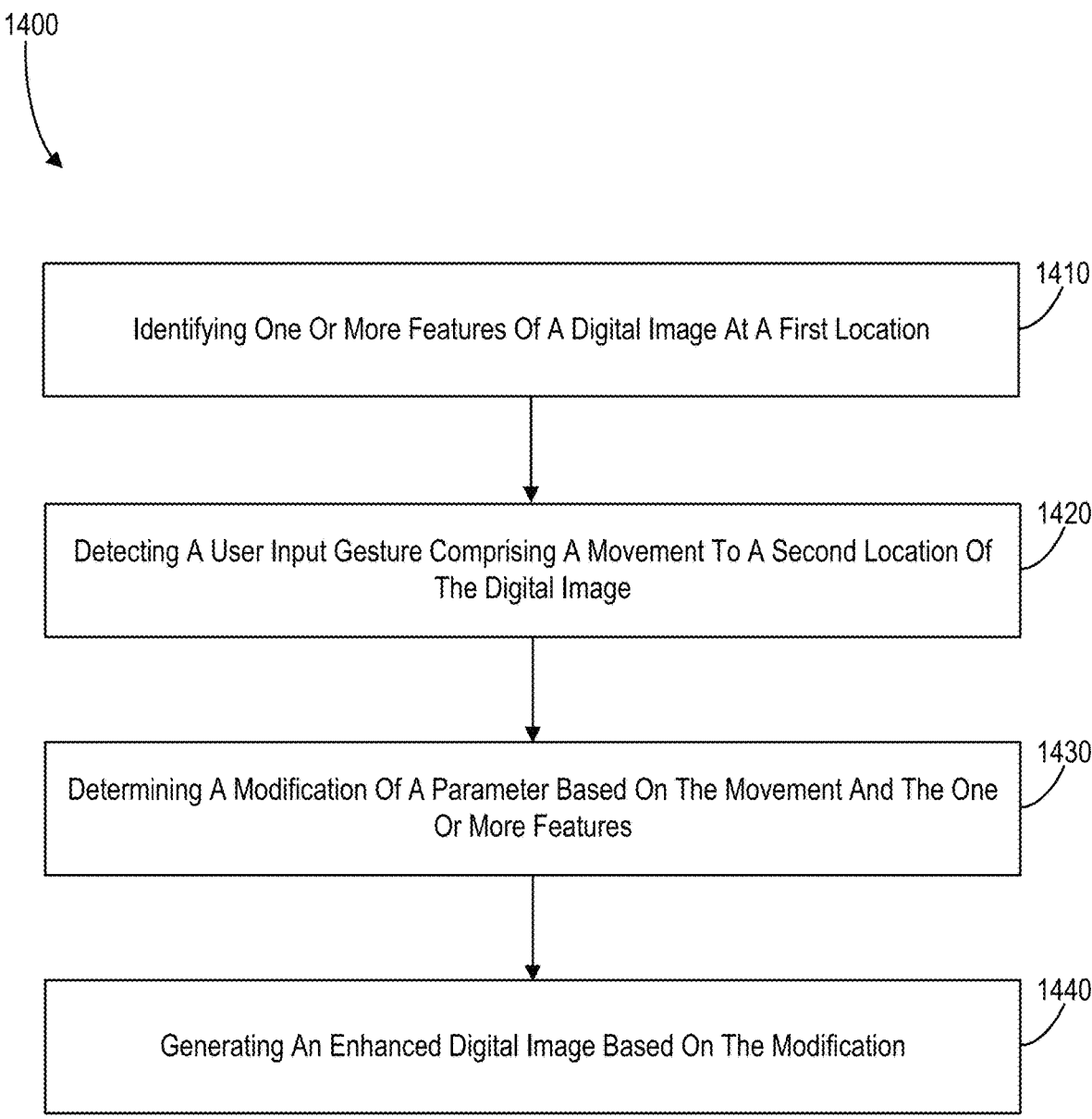
FIG. 14 illustrates a flowchart of a series of acts for generating an enhanced digital image in accordance with one or more embodiments.

While FIGS. 13-14 illustrate acts according to some embodiments, alternative embodiments may omit, add to, reorder, and/or modify any of the acts shown in FIGS. 13-14. The acts of FIGS. 13-14 can be performed as part of a method. Alternatively, a non-transitory computer-readable medium can comprise instructions, that when executed by one or more processors, cause a computing device to perform the acts of FIGS. 13-14. In still further embodiments, a system can perform the acts of FIGS. 13-14. Additionally, the acts described herein may be repeated or performed in parallel with one another or in parallel with different instances of the same or other similar acts.

For example, FIG. 13 illustrates an example series of acts 1300 for generating an enhanced digital image in accordance with one or more embodiments. As shown in FIG. 13, the series of acts includes an act 1310 of identifying a user selection of a first location of a digital image. For example, the act 1310 can include identifying a user selection of a first location of a digital image within a digital image enhancement user interface. In some embodiments, the act 1310 includes based on the user selection of the first location of the digital image within the digital image enhancement user interface, detecting one or more features of the digital image at the first location. Moreover, the act 1310 can also include identifying, within a digital image enhancement user interface, one or more features of a digital image at a first location based on a user selection of the first location. In one or more embodiments, the act 1310 includes providing a sensor for display via the digital image enhancement user interface and detecting a user interaction with the sensor at the first location. Thus, in some embodiments, the first location is a sensor location.

As shown in FIG. 13, the series of acts 1300 also includes an act 1320 of detecting a user input gesture across the digital image in a first direction and a second direction. For example, the act 1320 can include detecting a user input gesture across the digital image comprising a first movement in a first direction and a second movement in a second direction. In some embodiments, the act 1320 comprises receiving a user input gesture comprising a two-direction movement across the digital image within the digital image enhancement user interface. In one or more embodiments, the digital image enhancement system 110 detects the user input gesture in response to a user interaction with the sensor. Moreover, in some embodiments, the first movement is a horizontal direction and the second movement is a vertical direction.

As shown in FIG. 13, the series of acts 1300 also includes an act 1330 of determining a first modification of a first parameter based on the first direction. For example, the act 1330 can include determining a first modification of a first parameter of the digital image to perform based on the first movement in the first direction. In some embodiments, the act 1330 includes determining the first modification of the first parameter of the digital image based on the first movement in the first direction and the one or more features of the digital image at the first location.

As shown in FIG. 13, the series of acts 1300 also includes an act 1340 of determining a second modification of a second parameter based on the second direction. For example, the act 1340 can include determine a second modification of a second parameter of the digital image to perform based on the second movement in the second direction. In some embodiments, the act 1340 includes determine the second modification of the second parameter of the digital image based on the second movement in the second direction and the one or more features of the digital image at the first location. In some embodiments, the first parameter and the second parameter comprise at least two of: hue, saturation, brightness, contrast, exposure, shadow, highlight, black point, white point, vibrance, clarity, color temperature, or color tint.

Moreover, in some embodiments, the first parameter and second parameter reflect features at the first location. For example, the first parameter and the second parameter can include a parameter corresponding to a particular feature (e.g., a detected feature range or object). To illustrate, the first parameter can comprise a hue parameter for modifying pixels of a digital image that correspond to (e.g., portray) at least one of: a detected hue, a detected saturation, a detected brightness, or a detected object. Similarly, the first parameter can comprise a saturation parameter or a brightness parameter for modifying pixels of a digital image that correspond to (e.g., portray) at least one of: a detected hue, a detected saturation, a detected brightness, or a detected object.

As shown in FIG. 13, the series of acts 1300 also includes an act 1350 of generating an enhanced digital image based on the first modification and the second modification. For example, the act 1350 can include generating an enhanced digital image by making the first modification to the first parameter and the second modification to the second parameter. In some embodiments, the act 1350 includes providing the enhanced digital image for display.

In some embodiments, the series of acts 1300 includes detecting the one or more features of the digital image at the first location by detecting a hue of the digital image at the first location; determining the first modification of the first parameter of the digital image at the first location based on the first movement in the first direction and the hue of the digital image at the first location; and determining the second modification of the second parameter of the digital image at the first location based on the second movement in the second direction and the hue of the digital image at the first location.

In addition, in some embodiments, the series of acts 1300 includes detecting the one or more features of the digital image at the first location by detecting an object portrayed in the digital image at the first location; determining the first modification of the first parameter of the digital image at the first location based on the first movement in the first direction and the object portrayed in the digital image at the first location; and determining the second modification of the second parameter of the digital image at the first location based on the second movement in the second direction and the object portrayed in the digital image at the first location.

Moreover, in one or more embodiments, the series of acts 1300 includes detecting an additional user input gesture associated with the enhanced digital image; and in response to the additional user input gesture, transitioning from displaying the enhanced digital image to displaying the digital image within the digital image enhancement user interface for a duration of the additional user input gesture. For example, the acts 1300 can include displaying the enhanced digital image; in response to detecting the additional user input gesture, displaying the digital image; and in response to detecting completion of the additional user input gesture, displaying the enhanced digital image.

In addition, in some embodiments, the series of acts 1300 includes determining the first parameter of the digital image and the second parameter of the digital image based on a first input mode; and in response to detecting a mode selection user input, modifying the first input mode to a second input mode corresponding to a third parameter and a fourth parameter.

Further, in one or more embodiments, the series of acts 1300 includes identifying a second user selection of a second location of the enhanced digital image within the digital image enhancement user interface; detecting a second user input gesture comprising a third movement in a third direction and a fourth movement in a fourth direction; determining a third modification of the third parameter of the enhanced digital image based on the third movement in the third direction and the second input mode; determining a fourth modification of the fourth parameter of the enhanced digital image based on the fourth movement in the fourth direction and the second input mode; and generating an updated enhanced digital image by making the third modification of the third parameter and the fourth modification of the fourth parameter.

For example, in some embodiments, the first input mode corresponds to first parameter and the second parameter. Moreover, in some embodiments, the second input mode corresponds to the third parameter and the fourth parameter. In one or more embodiments, the first input mode also corresponds to a feature type. Furthermore, in one or more embodiments, the second input mode corresponds to a second feature type.

In some embodiments, the user input gesture comprising the two-direction movement across the digital image comprises a first movement in a first direction corresponding to a first modification and a second movement in a second direction corresponding to a second modification; and the enhanced digital image reflects the first modification and the second modification.

In addition, in some embodiments, the digital image enhancement user interface does not include a visual element for modifying parameter values of the first parameter or parameter values of the second parameter. Moreover, in one or more embodiments, the digital image enhancement user interface contains no visual slider elements.

In addition, FIG. 14 illustrates an example series of acts 1400 for generating an enhanced digital image in accordance with one or more embodiments. As shown in FIG. 14, the series of acts 1400 also includes an act 1410 of identifying one or more features of a digital image at a first location. For example, the act 1410 can include identifying one or more features of a digital image at a first location based on a user selection of the first location within a digital image enhancement user interface. In some embodiments, the act 1410 includes providing a transparent sensor for display at the first location based on the user selection of the first location within the digital image enhancement user interface; and identifying the one or more features by analyzing a region of the digital image encompassed by the transparent sensor. The act 1410 can also include identifying one or more of brightness at the first location, hue at the first location, or an object at the first location.

As shown in FIG. 14, the series of acts 1400 also includes an act 1420 of detecting a user input gesture comprising a movement to a second location of the digital image. For example, the act 1420 can include detecting a user input gesture comprising a movement to a second location of the digital image within the digital image enhancement user interface. In some embodiments, the act 1420 includes detecting a movement from an initial location of the digital image within the digital image enhancement user interface to the second location of the digital image within the digital image enhancement user interface.

As shown in FIG. 14, the series of acts 1400 also includes an act 1430 of determining a modification of a parameter based on the movement and the one or more features. For example, the act 1430 can include determining a modification of a parameter of the digital image based on the movement to the second location and the one or more features of the digital image at the first location. In some embodiments, the act 1430 includes selecting the parameter based on the one or more features of the digital image at the first location; and identifying a parameter value of the parameter based on the second location within the user interface. To illustrate, the act 1430 can include determining the parameter value of the parameter based on the second location based on at least one of: a relative displacement between the second location and an initial location of the user input gesture; or a mapping between an absolute position of the second location within the digital image enhancement user interface and the parameter value.

As shown in FIG. 14, the act 1440 includes generating an enhanced digital image based on the modification. For example, the act 1440 can include generating an enhanced digital image by making the modification of the parameter.

In some embodiments, the series of acts 1400 includes determining a vertical movement and a horizontal movement from the user input gesture comprising the movement to the second location; determining the modification of the parameter of the digital image based on the vertical movement and the one or more features of the digital image at the first location; determining an additional modification of an additional parameter of the digital image based on the horizontal movement and the one or more features of the digital image at the first location; and generating the enhanced digital image by making the modification of the parameter and the additional modification of the additional parameter.

In one or more embodiments, the series of acts 1300 and/or the series of acts 1400 include a step for generating an enhanced digital image utilizing the two-direction movement and the one or more features. For example, the algorithms and acts described with reference to FIGS. 2-4 can comprise the corresponding structure for performing a step for generating an enhanced digital image utilizing the two-direction movement and the one or more features.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
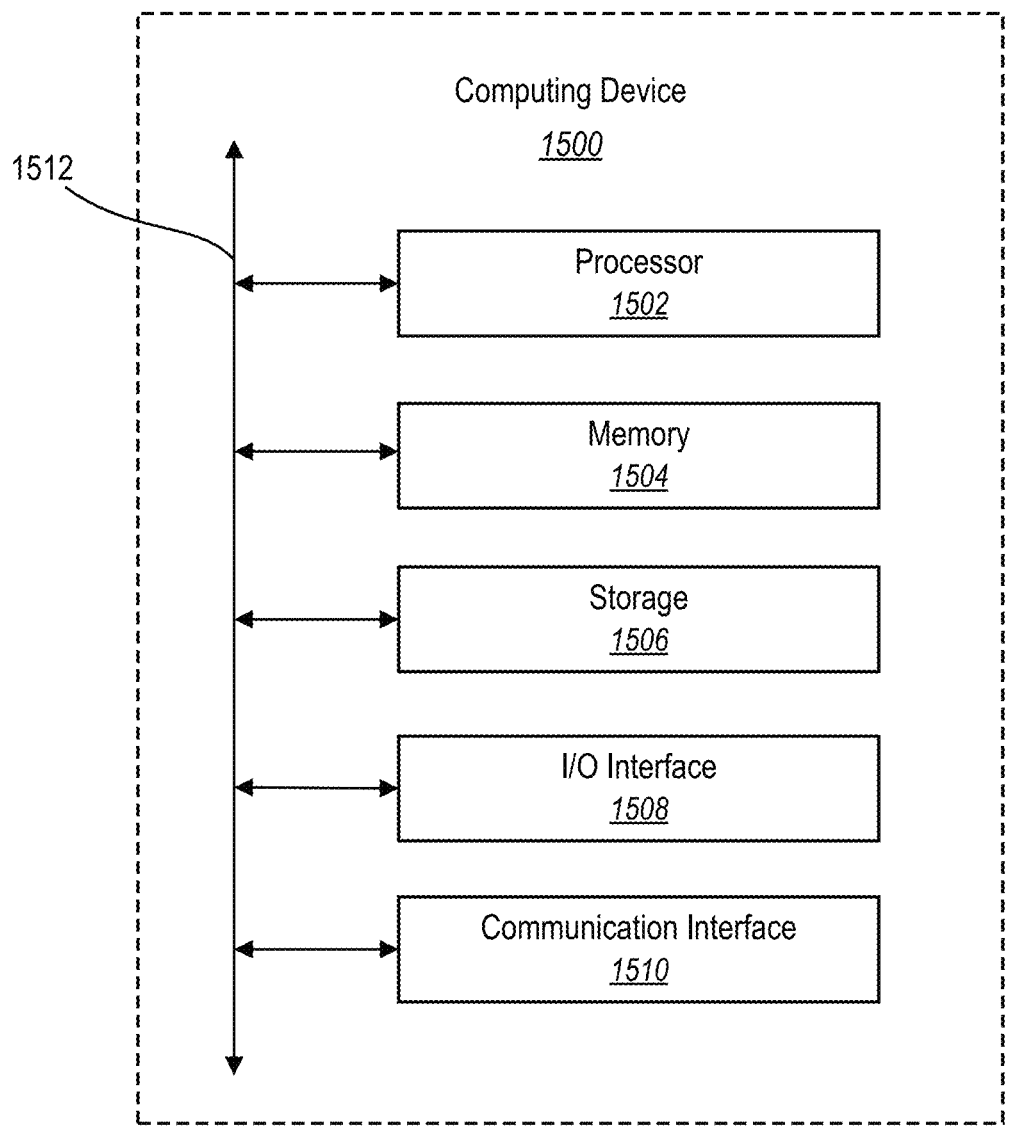
FIG. 15 illustrates a block diagram of an example computing device in accordance with one or more embodiments.

FIG. 15 illustrates, in block diagram form, an example computing device 1500 (e.g., the client devices 104a-104n; and/or the server device(s) 102; the computing devices 302, 402, 500, 700, 900, or 1000; and/or the computing device 1200) that may be configured to perform one or more of the processes described above. One will appreciate that digital image enhancement system 110 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a writing device or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable medium storing instructions thereon that, when executed by at least one processor, cause a computing device to:
   receive, via a digital image enhancement user interface, a user selection of a structural mode corresponding to an object identification model from a plurality of modes;
   identify a user selection of a first location of a digital image within the digital image enhancement user interface;
   provide, for display via the digital image enhancement user interface, a visual sensor indicating an area to be processed based on the user selection of the first location;
   identify, from a plurality of object classes and based on the user selection of the structural mode, an object class corresponding to an object portrayed in the digital image within the area of the visual sensor by processing the area of the visual sensor of the digital image utilizing the object identification model;
   detect a user input gesture across the digital image comprising a first movement in a first direction and a second movement in a second direction;
   determine a first modification of a first parameter of the digital image to perform based on the first movement in the first direction, wherein the first parameter is selected based on the object class corresponding to the object portrayed in the digital image at the first location;
   determine a second modification of a second parameter of the digital image to perform based on the second movement in the second direction, wherein the second parameter is selected based on the object class corresponding to the object portrayed in the digital image at the first location; and
   generate an enhanced digital image by making the first modification to the first parameter and the second modification to the second parameter.

2. The non-transitory computer-readable medium as recited in claim 1, wherein the digital image enhancement user interface does not include a visual element for modifying parameter values of the first parameter or parameter values of the second parameter.

3. The non-transitory computer-readable medium as recited in claim 1, further storing instructions thereon that, when executed by the at least one processor, cause the computing device to identify the object within the area of the visual sensor by:
   detecting objects within the digital image by utilizing the object identification model; and
   based on detecting the objects within the digital image, identifying a portion of the object within the area of the visual sensor.

4. The non-transitory computer-readable medium as recited in claim 1, further storing instructions thereon that, when executed by the at least one processor, cause the computing device to:
   identify one or more additional features of the digital image; and
   determine the first modification of the first parameter of the digital image at the first location based on the first movement in the first direction, the object class of the object portrayed in the digital image within the area of the visual sensor, and the one or more additional features.

5. The non-transitory computer-readable medium as recited in claim 4, further storing instructions thereon that, when executed by the at least one processor, cause the computing device to:
   detect the one or more additional features of the digital image at the first location by detecting a geographic location portrayed in the digital image; and
   determine the first modification of the first parameter of the digital image based on the first movement in the first direction, the object class of the object portrayed in the digital image within the area of the visual sensor, and the geographic location portrayed in the digital image.

6. The non-transitory computer-readable medium as recited in claim 1, wherein the first parameter and the second parameter comprise at least two of: hue, saturation, brightness, contrast, exposure, shadow, highlight, black point, white point, vibrance, clarity, color temperature, or color tint.

7. The non-transitory computer-readable medium as recited in claim 4, further storing instructions thereon that, when executed by the at least one processor, cause the computing device to:
determine the second modification of the second parameter of the digital image based on the second movement in the second direction, the one or more additional features of the digital image, and the object portrayed in the digital image within the area of the visual sensor.

8. The non-transitory computer-readable medium as recited in claim 1, further storing instructions thereon that, when executed by the at least one processor, cause the computing device to:
detect an additional user input gesture associated with the enhanced digital image; and
in response to the additional user input gesture, transition from displaying the enhanced digital image to displaying the digital image within the digital image enhancement user interface for a duration of the additional user input gesture.

9. The non-transitory computer-readable medium as recited in claim 1, further storing instructions thereon that, when executed by the at least one processor, cause the computing device to:
determine the first parameter of the digital image and the second parameter of the digital image based on a first input mode; and
in response to detecting a mode selection user input, modify the first input mode to a second input mode corresponding to a third parameter and a fourth parameter.

10. The non-transitory computer-readable medium as recited in claim 9, further storing instructions thereon that, when executed by the at least one processor, cause the computing device to:
identify a second user selection of a second location of the enhanced digital image within the digital image enhancement user interface;
detect a second user input gesture comprising a third movement in a third direction and a fourth movement in a fourth direction;
determine a third modification of the third parameter of the enhanced digital image based on the third movement in the third direction and the second input mode;
determine a fourth modification of the fourth parameter of the enhanced digital image based on the fourth movement in the fourth direction and the second input mode; and
generate an updated enhanced digital image by making the third modification of the third parameter and the fourth modification of the fourth parameter.

11. A system comprising:
at least one processor; and
at least one non-transitory computer-readable medium storing instructions that, when executed by the at least one processor, cause the system to:
receive, via a digital image enhancement user interface, a user selection of a structural mode corresponding to an object identification model from a plurality of modes;
identify a user selection of a first location of a digital image within the digital image enhancement user interface;
provide, for display via the digital image enhancement user interface, a visual sensor indicating an area to be processed based on the user selection of the first location;
identify, from a plurality of object classes and based on the user selection of the structural mode, an object class corresponding to an object portrayed in the digital image within the area of the visual sensor by processing the area of the visual sensor of the digital image utilizing the object identification model;
select a parameter of the digital image to modify from a plurality of parameters based on the object class corresponding to the object portrayed in the digital image at the first location;
detect a user input gesture comprising a movement to a second location of the digital image within the digital image enhancement user interface;
determine a modification of the parameter of the digital image based on the movement to the second location and the object class corresponding to the object portrayed in digital image at the first location; and
generate an enhanced digital image by making the modification of the parameter.

12. The system as recited in claim 11, further comprising instructions that, when executed by the at least one processor, cause the system to identify the object within the area of the visual sensor by:
identifying objects within the digital image by utilizing the object identification model; and
identifying a portion of the object within the area of the visual sensor.

13. The system as recited in claim 11, further storing instructions that, when executed by the at least one processor, cause the system to:
identify one or more additional features of the digital image; and
determine the modification of the parameter of the digital image at the first location based on the movement, the object class of the object portrayed in the digital image within the area of the visual sensor, and the one or more additional features.

14. The system as recited in claim 11, further storing instructions that, when executed by the at least one processor, cause the system to determine the modification of the parameter of the digital image by identifying a parameter value of the parameter based on the second location within the digital image enhancement user interface.

15. The system as recited in claim 14, further storing instructions that, when executed by the at least one processor, cause the system to determine the parameter value of the parameter based on the second location based on at least one of:
a relative displacement between the second location and an initial location of the user input gesture; or
a mapping between an absolute position of the second location within the digital image enhancement user interface and the parameter value.

16. The system as recited in claim 15, further storing instructions that, when executed by the at least one processor, cause the system to:

determine a vertical movement and a horizontal movement from the user input gesture comprising the movement to the second location;

determine the modification of the parameter of the digital image based on the vertical movement and the object class of the object portrayed in the digital image at the first location;

determine an additional modification of an additional parameter of the digital image based on the horizontal movement and the object class of the object portrayed in the digital image at the first location; and generate the enhanced digital image by making the modification of the parameter and the additional modification of the additional parameter.

17. A computer-implemented method of efficiently generating modified digital images comprising:

receiving, via a digital image enhancement user interface, a user selection of a structural mode corresponding to an object identification model from a plurality of modes;

identifying a user selection of a first location of a digital image within the digital image enhancement user interface;

providing, for display via the digital image enhancement user interface, a visual sensor indicating an area to be processed based on the user selection of the first location;

identifying, from a plurality of object classes and based on the user selection of the structural mode, an object class corresponding to an object portrayed in the digital image within the area of the visual sensor by processing the area of the visual sensor of the digital image utilizing the object identification model;

receiving a user input gesture comprising a two-direction movement across the digital image within the digital image enhancement user interface;

selecting a first modification and a second modification based on the object class corresponding to the object portrayed in the digital image at the first location; and generating an enhanced digital image by applying the first modification and the second modification in accordance with the two-direction movement.

18. The computer-implemented method as recited in claim 17, wherein the digital image enhancement user interface contains no visual slider elements.

19. The computer-implemented method as recited in claim 17, further comprising selecting the first modification and the second modification based on one or more additional features of the digital image at the first location, wherein the one or more additional features comprise a time portrayed in the digital image.

20. The computer-implemented method as recited in claim 17, wherein the user input gesture comprising the two-direction movement across the digital image comprises a first movement in a vertical direction corresponding to the first modification and a second movement in a horizontal direction corresponding to the second modification.

* * * * *